United States Patent
Yamamura et al.

(10) Patent No.: US 9,168,860 B2
(45) Date of Patent: Oct. 27, 2015

(54) VEHICLE DISPLAY DEVICE

(75) Inventors: Norihiro Yamamura, Miyoshi (JP); Koji Hayashi, Aichi-gun (JP); Takeshi Kanayama, Toyota (JP); Tetsuo Hori, Toyota (JP); Tomoyuki Maruyama, Tajimi (JP); Akiko Nishimine, Toyota (JP); Takeshi Miyagawa, Toyokawa (JP); Ryoki Il, Toyota (JP); Tomoaki Furukawa, Toyota (JP); Akihiro Sato, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/116,218

(22) PCT Filed: May 10, 2011

(86) PCT No.: PCT/JP2011/060777
§ 371 (c)(1),
(2), (4) Date: Nov. 7, 2013

(87) PCT Pub. No.: WO2012/153395
PCT Pub. Date: Nov. 15, 2012

(65) Prior Publication Data
US 2014/0077941 A1 Mar. 20, 2014

(51) Int. Cl.
*B60Q 1/00* (2006.01)
*B60K 35/00* (2006.01)
(Continued)

(52) U.S. Cl.
CPC ... *B60Q 1/00* (2013.01); *B60K 1/02* (2013.01); *B60K 35/00* (2013.01); *B60K 37/02* (2013.01);
(Continued)

(58) Field of Classification Search
CPC .............................. B60W 20/00; B60K 35/00
USPC ................. 340/438, 455, 461, 636.1, 636.15, 340/995.15; 701/22
See application file for complete search history.

(56) References Cited

U.S. PATENT DOCUMENTS 8,058,982 B2 * 11/2011 Crowe et al. .................. 340/455
8,386,104 B2 * 2/2013 Kuang et al. .................... 701/22
(Continued)

FOREIGN PATENT DOCUMENTS

| CN | 101900618 A | 12/2010 |
| JP | A-61-140869 | 6/1986 |
| JP | Y2-63-1211 | 1/1988 |
| JP | A-2004-264106 | 9/2004 |

(Continued)

OTHER PUBLICATIONS

Partial translation of the Written Opinion of the International Searching Authority issued in International Application No. PCT/JP2011/060777 mailed Jul. 19, 2011.

*Primary Examiner* — Tai T Nguyen
(74) *Attorney, Agent, or Firm* — Oliff PLC

(57) ABSTRACT

A vehicular indicator device for a hybrid vehicle which is provided with vehicle drive power sources in the form of an engine and an electric motor and which is driven in one of a plurality of vehicle drive modes including an EV drive mode, a series HV drive mode and a parallel HV drive mode that is automatically selected according to a vehicle drive power, said indicator device being configured to indicate the selected vehicle drive mode and said vehicle drive power, the vehicular indicator device being configured to indicate a running state of the hybrid vehicle as represented by said vehicle drive power and said selected vehicle drive mode, in a two-dimensional coordinate system on a display screen, which coordinate system is defined by said vehicle drive power and said selected vehicle drive mode.

7 Claims, 13 Drawing Sheets

(51) Int. Cl.
  B60W 20/00 (2006.01)
  B60K 37/02 (2006.01)
  B60K 1/02 (2006.01)
  B60W 10/06 (2006.01)
  B60W 10/08 (2006.01)
  B60W 50/14 (2012.01)

(52) U.S. Cl.
  CPC ........ B60W 20/00 (2013.01); *B60K 2350/1064* (2013.01); *B60K 2350/1072* (2013.01); *B60K 2350/1092* (2013.01); *B60L 2250/16* (2013.01); *B60W 10/06* (2013.01); *B60W 10/08* (2013.01); *B60W 2050/146* (2013.01); *B60W 2510/106* (2013.01); *B60W 2540/04* (2013.01); *B60W 2540/10* (2013.01); *B60Y 2200/90* (2013.01)

(56) References Cited

U.S. PATENT DOCUMENTS

| | | |
|---|---|---|
| 2006/0185917 A1 | 8/2006 | Ozeki et al. |
| 2009/0322503 A1 | 12/2009 | Suzuki et al. |
| 2010/0305795 A1 | 12/2010 | Kuang et al. |
| 2011/0295456 A1* | 12/2011 | Yamamoto et al. ............. 701/22 |
| 2011/0320088 A1* | 12/2011 | Eom et al. ....................... 701/29 |

FOREIGN PATENT DOCUMENTS

| | | |
|---|---|---|
| JP | A-2006-256423 | 9/2006 |
| JP | A-2007-125921 | 5/2007 |
| JP | A-2008-74321 | 4/2008 |
| JP | A-2009-40197 | 2/2009 |
| JP | A-2009-143553 | 7/2009 |
| JP | A-2010-23740 | 2/2010 |

* cited by examiner

FIG.2

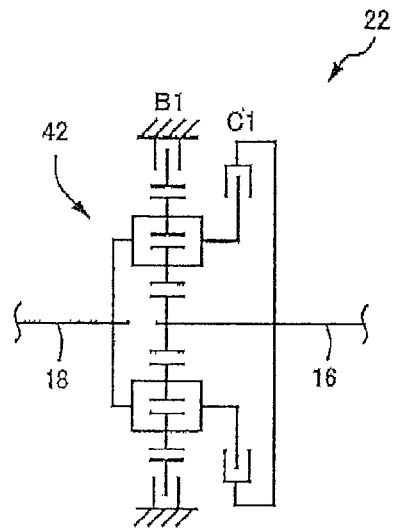

FIG.3

| | | ENGINE 12 | MG1 | MG2 | STARTING CLUTCH 26 |
|---|---|---|---|---|---|
| EV DRIVE MODE | | REST STATE | FREE STATE | VEHICLE DRIVING STATE | POWER CUTOFF STATE |
| SERIES HV DRIVE MODE | | OPERATED STATE | ELECTRICITY GENERATING STATE | VEHICLE DRIVING STATE | POWER CUTOFF STATE |
| PARALLEL HV DRIVE MODE | 1 | OPERATED STATE | VEHICLE DRIVING STATE | FREE STATE | POWER TRANSMITTING STATE |
| | 2 | OPERATED STATE | ELECTRICITY GENERATING STATE | VEHICLE DRIVING STATE | POWER TRANSMITTING STATE |
| | 3 | OPERATED STATE | FREE STATE | FREE STATE | POWER TRANSMITTING STATE |
| DECELERATING DRIVE MODE | | REST STATE | FREE STATE | ELECTRICITY GENERATING STATE | POWER CUTOFF STATE |

|  | ECONOMY RUNNING MODE | NORMAL RUNNING MODE | POWER RUNNING MODE (SPORTY RUNNING MODE) |
|---|---|---|---|
| A (EV⇔SERIES HV) | Aeco=50 | Anormal=30 | Apower=10 |
| B (SERIES HV⇔PARALLEL HV) | Beco=90 | Bnormal=70 | Bpower=40 |

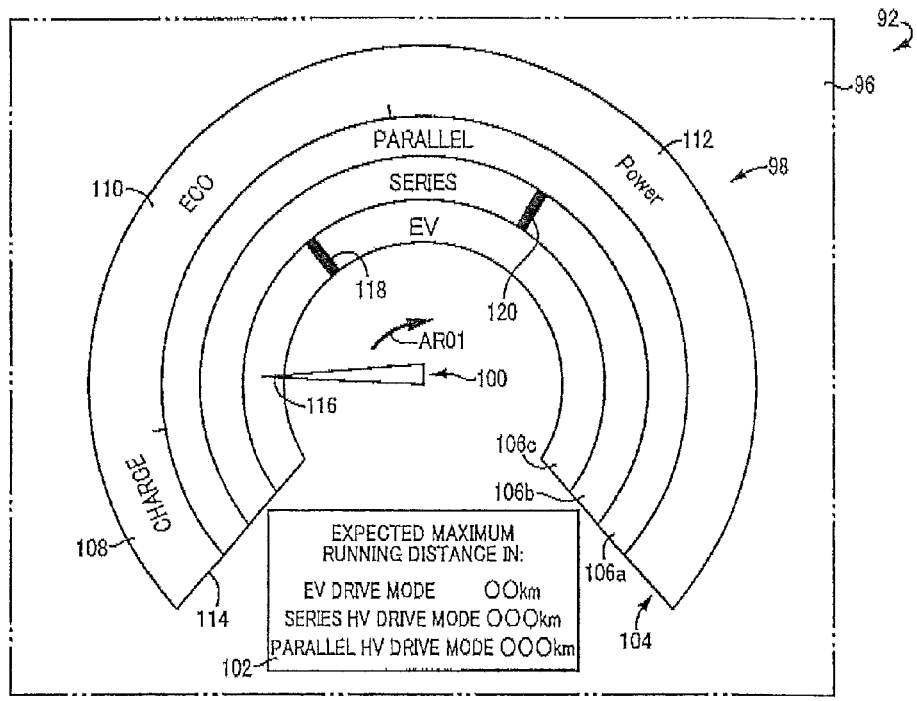
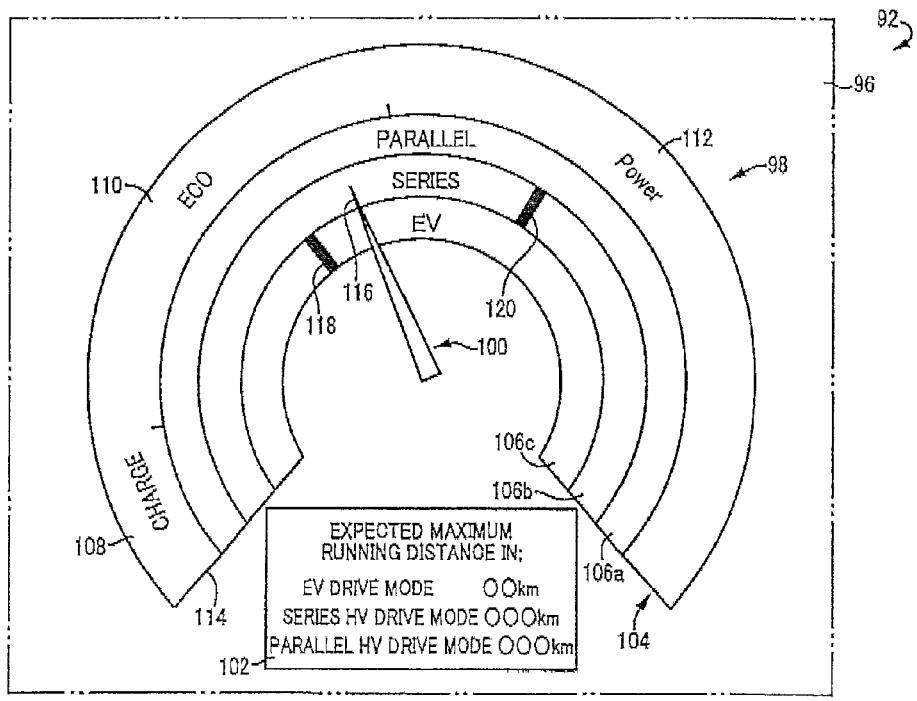

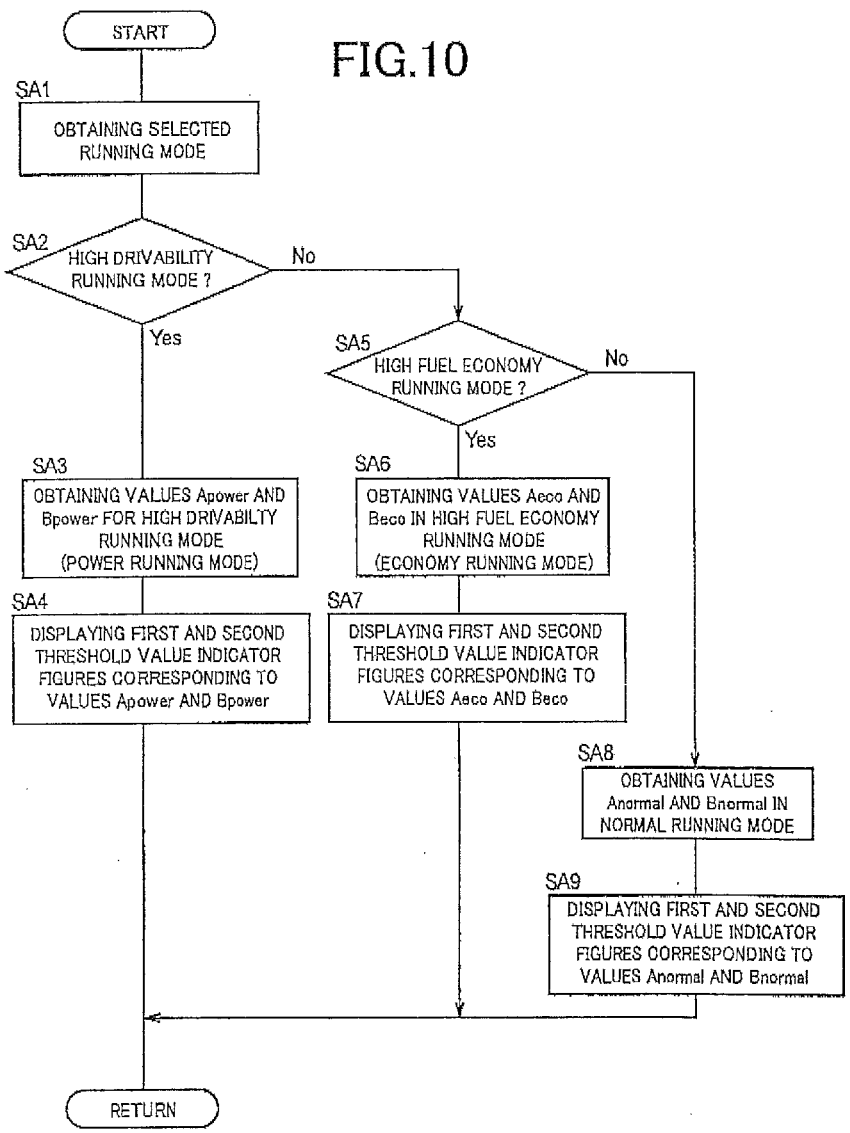

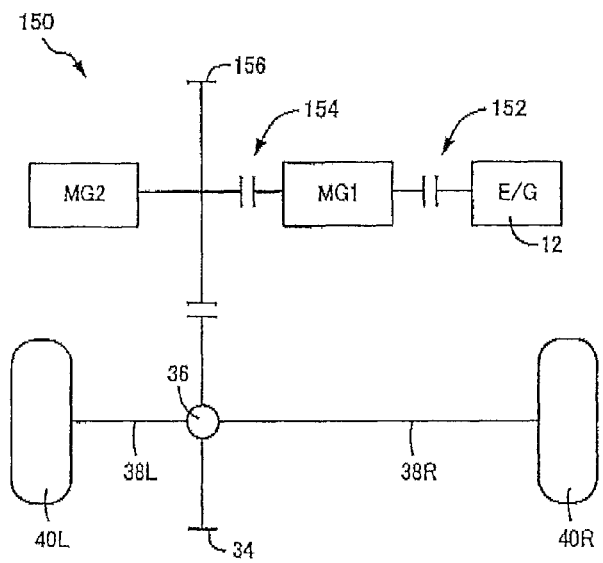

FIG.12(a)
CONSTRUCTION

FIG.12(b)
VEHICLE RUNNING MODE

|  |  | ENGINE 12 | MG1 | MG2 | FIRST CLUTCH 152 | SECOND CLUTCH 154 |
|---|---|---|---|---|---|---|
| EV DRIVE MODE | | REST STATE | FREE STATE | VEHICLE DRIVING STATE | POWER CUTOFF STATE | POWER CUTOFF STATE |
| SERIES HV DRIVE MODE | | OPERATED STATE | ELECTRICITY GENERATING STATE | VEHICLE DRIVING STATE | POWER TRANSMITTING STATE | POWER CUTOFF STATE |
| PARALLEL HV DRIVE MODE | 1 | OPERATED STATE | VEHICLE DRIVING STATE | FREE STATE | POWER TRANSMITTING STATE | POWER TRANSMITTING STATE |
| | 2 | OPERATED STATE | ELECTRICITY GENERATING STATE | VEHICLE DRIVING STATE | POWER TRANSMITTING STATE | POWER TRANSMITTING STATE |
| | 3 | OPERATED STATE | FREE STATE | FREE STATE | POWER TRANSMITTING STATE | POWER TRANSMITTING STATE |
| DECELERATING DRIVE MODE | | REST STATE | FREE STATE | ELECTRICITY GENERATING STATE | POWER CUTOFF STATE | POWER CUTOFF STATE |

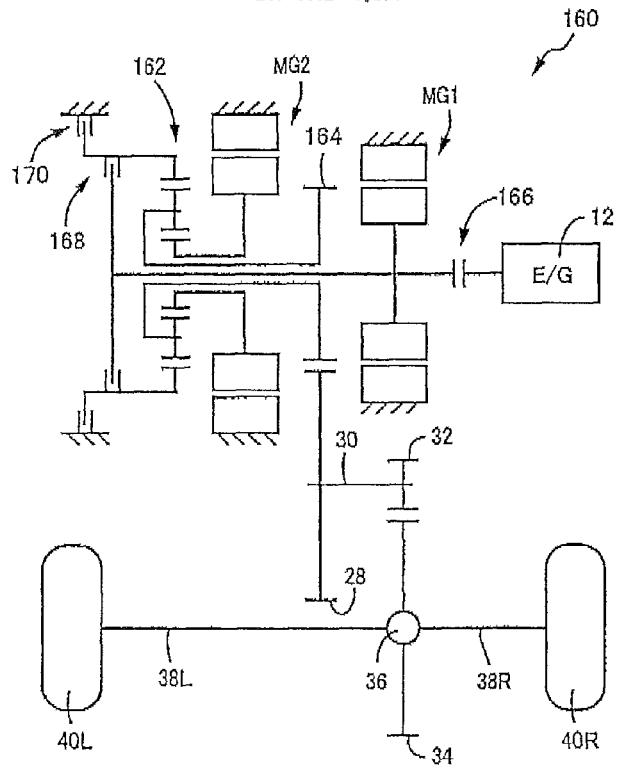

FIG.13(a)
CONSTRUCTION

FIG.13(b)
VEHICLE RUNNING MODE

| | | ENGINE 12 | MG1 | MG2 | FIRST CLUTCH 166 | SECOND CLUTCH 168 | BRAKE 170 |
|---|---|---|---|---|---|---|---|
| EV DRIVE MODE | | REST STATE | FREE STATE | VEHICLE DRIVING STATE | POWER CUTOFF STATE | POWER CUTOFF STATE | ENGAGED |
| SERIES HV DRIVE MODE | | OPERATED STATE | ELECTRICITY GENERATING STATE | VEHICLE DRIVING STATE | POWER TRANSMITTING STATE | POWER CUTOFF STATE | ENGAGED |
| PARALLEL HV DRIVE MODE | 1 | OPERATED STATE | FREE STATE | VEHICLE DRIVING STATE | POWER TRANSMITTING STATE | POWER TRANSMITTING STATE | RELEASED |
| | 2 | OPERATED STATE | ELECTRICITY GENERATING STATE | VEHICLE DRIVING STATE | POWER TRANSMITTING STATE | POWER TRANSMITTING STATE | RELEASED |
| DECELERATING DRIVE MODE | | REST STATE | FREE STATE | ELECTRICITY GENERATING STATE | POWER CUTOFF STATE | POWER CUTOFF STATE | ENGAGED |

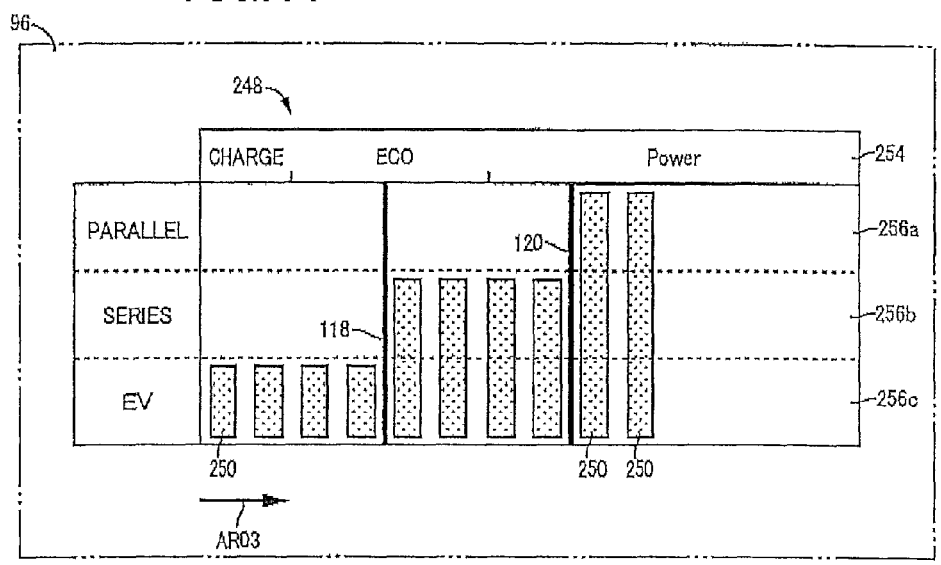

VEHICLE DISPLAY DEVICE

TECHNICAL FIELD

The present invention relates to techniques for indicating a running state of a hybrid vehicle.

BACKGROUND ART

There is known an indicator device for a hybrid vehicle having a plurality of drive modes one of which is selected according to a vehicle drive power, which indicator device is configured to indicate the selected drive mode and quantities relating to running conditions of the vehicle. Patent Document 1 discloses an example of such an indicator device for a hybrid vehicle. The hybrid vehicle of this Patent Document 1 is arranged to select one of a first drive mode for driving the hybrid vehicle with an engine held at rest, and a second drive mode far driving the hybrid vehicle with both of the engine and an electric motor. The indicator device of the Patent Document 1 is provided with a first indicator portion for indicating an operation amount of an accelerator pedal, and a second indicator portion including a drive mode indicator area. This drive mode indicator area is divided into a first indicator region for indicating that the selected drive mode is the above-described first drive mode, and a second indicator region for indicating that the selected drive mode is the above-described second drive mode. A division line indicating a boundary between the first and second indicator regions is displayed in the above-described second indicator portion, in relation to the accelerator pedal operation amount.

PRIOR ART DOCUMENTS

Patent Documents

Patent Document 1: JP-A-2008-074321
Patent Document 2: JP-A-2006-256423
Patent Document 3: JP-A-2009-040197

SUMMARY OF THE INVENTION

Object Achieved by the Invention

Although the drive mode of the above-described hybrid vehicle is basically switched depending upon the above-indicated accelerator pedal operation amount, the drive mode may be switched while taking account of running conditions of the vehicle other than the accelerator pedal operation amount. Namely, the different drive modes may be selected for the same vehicle drive power represented by the accelerator pedal operation amount, depending upon the various other running conditions. For the hybrid vehicle arranged to switch the drive mode depending upon the various running conditions other than the accelerator pedal operation amount, the indicator device of the above-identified Patent Document 1 does not permit accurate indication of the selected drive mode and the vehicle drive power, with a high degree of visual perceptibility on the side of the user of the vehicle. In this connection, it is noted that this problem is not publicly recognized.

The present invention was made in view of the background art described above. It is therefore an object of the present invention to provide an indicator device for a vehicle, which permits indication of the selected drive mode and the vehicle drive power, with a high degree of visual perceptibility.

Means for Achieving the Object

The object indicated above is achieved according to a first aspect of the present invention, which provides a vehicular indicator device for (a) a hybrid vehicle which is provided with vehicle drive power sources in the form of an engine and an electric motor and which is driven in one of a plurality of vehicle drive modes that is automatically selected according to a vehicle drive power the indicator device being configured to indicate the selected vehicle drive mode and the vehicle drive power, (b) characterized by indicating a running state of the hybrid vehicle as represented by the above-described vehicle drive power and the above-described selected vehicle drive mode, in a two-dimensional coordinate system on a display screen, which coordinate system is defined by the vehicle drive power and the selected vehicle drive mode.

Advantages of the Invention

The present vehicular indicator device according to the first aspect of the invention indicates the above-indicated vehicle running state in the two-dimensional coordinate system defined by parameters in the form of the above-described vehicle drive power and the above-described selected vehicle drive mode, such that the vehicular indicator device permits concurrent indication of the vehicle drive power and the selected vehicle drive mode, without the indication of the selected vehicle drive mode being influenced by a change of the vehicle drive power. Namely, the vehicle drive power and the selected vehicle drive mode can be concurrently displayed on the display screen. Accordingly, the vehicular indicator device permits indication of the selected drive mode and the vehicle drive power, with a high degree of visual perceptibility by the vehicle user. The number of the electric motor is not limited to one. That is, the hybrid vehicle may include two or more electric motors that perform as drive power sources.

According to a second aspect of this invention, the vehicular indicator device according to the above-described first aspect of the invention is configured to display, on the above-described display screen, a first figure a state of indication of which changes with a change of the above-described vehicle drive power and a second figure divided into regions respectively corresponding to the above-described plurality of vehicle drive modes, the above-described first figure pointing one of the regions within the second figure which corresponds to the above-described selected vehicle drive mode. According to this second aspect of the invention, the vehicle user observing the first figure can concurrently recognize the selected vehicle drive mode and the vehicle drive power. Namely, the vehicle user tracing the first figure can easily understand the selected vehicle drive mode and the vehicle drive power. It is noted that a change of the state of indication of the first figure may be a movement of the displayed first figure, or a change of a surface area of the displayed first figure as a result of its expansion or contraction.

According to a third aspect of the invention, the vehicular indicator device according to the above-described second aspect of the invention is configured to display a third figure indicative of a threshold value of the vehicle drive power used to select one of the above-described plurality of vehicle drive modes, at a position within the above-described display screen which corresponds to the threshold value. According to this third aspect of the invention, the vehicle user can expect a condition in which the selected vehicle drive mode is changed, so that the vehicle user can easily manipulate the vehicle for driving the vehicle in a desired condition. It is noted that the threshold value of the vehicle drive power indicated by the above-described third figure may be an upper limit of the vehicle drive power.

According to a fourth aspect of the invention, the vehicular indicator device according to the above-described second or third aspect of the invention is configured such that (a) different colors of display are predetermined respectively for the above-described plurality of vehicle drive modes, and (b) the above-described first figure is displayed in one of the different colors of display which corresponds to the above-described selected vehicle drive mode. In the vehicular indicator device according to this fourth aspect of the invention, the visual perceptibility of the selected vehicle drive mode can be made higher than in a vehicular indicator device in which the color of display of the first figure does not change.

According to a fifth aspect of the invention, the vehicular indicator device according to any one of the above-described second through fourth aspects of the invention is configured to (a) calculate an expected maximum running distance of the hybrid vehicle in each of the above-described plurality of vehicle drive modes, on the basis of an amount of an electric energy stored in an electric-energy storage device connected to said electric motor such that the electric energy is supplied to and received from the above-described electric motor, and an amount of a remaining fuel to be supplied to the above-described engine, and (b) indicate the calculated expected maximum running distance in said display screen. According to this fifth aspect of the invention, the vehicle user drives the vehicle while recognizing the indicated expected maximum running distance, facilitating the manipulation of the vehicle so as to improve the fuel economy. For example, the fuel economy is represented by a running distance of the vehicle per unit amount of consumption of the fuel, and an improvement of the fuel economy means an increase of the vehicle running distance per unit amount of consumption of the fuel, or a decrease of an overall fuel consumption ratio of the vehicle (=fuel consumption amount/drive wheel output). Conversely, deterioration of the fuel economy means a decrease of the vehicle running distance per unit amount of consumption of the fuel, or an increase of the overall fuel consumption ratio of the vehicle.

According to a sixth aspect of the invention, the vehicular indicator device according to any one of the above-described second through fifth aspects of the invention is configured such that (a) the above-described second figure has an arcuate drive power indicator region for indicating the above-described vehicle drive power, and a plurality of arcuate drive mode indicator regions located along and concentrically with the drive power indicator region and corresponding to the plurality of the drive modes, and (b) the above-described first figure takes the form of a needle which is pivoted about a pivot axis thereof lying on a center of curvature of the above-described drive power indicator region and the above-described drive mode indicator regions, to point a position within the above-described drive power indicator region, which position represents the vehicle drive power, the needle being displayed such that a length of the needle from its pivot axis is changed to point one of the above-described plurality of drive mode indicator regions which corresponds the above-described selected vehicle drive mode. According to this sixth aspect of the invention, the first and second figures cooperate to constitute an indicator meter such as ones commonly provided on vehicles, which permits the operator of the vehicle to easily and quickly recognise the selected vehicle drive mode and the vehicle drive power.

Preferably, the above-described plurality of vehicle drive modes are drive modes relating to the operating states of the above-described engine and the above-described electric motor. For example, the plurality of vehicle drive modes include: an EV drive mode in which the vehicle is driven with a drive force of the above-described electric motor while the above-described engine is held at rest; a series HV drive mode in which the vehicle is driven with the drive force of the above-described electric motor while the above-described engine is operated to generate an electric energy; and a parallel HV drive mode in which the vehicle is driven with a drive force of the above-described engine, or drive forces of the engine and the above-described electric motor.

Preferably, a threshold value of the vehicle drive power used to switch the vehicle drive mode between the above-described EV drive mode and series HV drive mode, and a threshold value of the vehicle drive power used to switch the vehicle drive mode between the above-described series and parallel HV drive modes are set to be lower when the vehicle operator desires to drive the vehicle with a high degree of drivability, than when the vehicle operator does not desire to drive the vehicle with the high degree of drivability.

Preferably, (a) the bands of the above-described second figure corresponding to the above-described respective vehicle drive modes are arranged in the direction intersecting the direction of pivoting of the first figure with a change of the above-described vehicle drive power and (b) the first figure in the form of a needle is displayed such that a pointing end portion of the first figure is located within the band corresponding to the selected vehicle drive mode. Thus, the vehicular indicator device is configured to permit the pointing end portion of the first figure to concurrently point the selected vehicle drive mode and the vehicle drive power so that the vehicle user (operator) can easily recognize the selected vehicle drive mode and the vehicle drive power, which are pointed by the pointing end portion.

BRIEF DESCRIPTION OF THE DRAWINGS

FIG. 2 is a schematic view showing one example of a forward-reverse switching device of FIG. 1;

FIG. 3 is a view for explaining various drive modes of the hybrid vehicle of FIG. 1 and operating states of various components of the hybrid vehicle;

FIG. 6 is a view showing one example of an image displayed on a display screen of a vehicular indicator device provided for the hybrid vehicle of FIG. 1, when an EV drive mode is selected as the drive mode of the hybrid vehicle;

FIG. 7 is a view showing one example of an image displayed on the display screen of the vehicular indicator device provided for the hybrid vehicle of FIG. 1, when a series HV drive mode is selected as the drive mode of the hybrid vehicle;

FIG. 10 is a flow chart illustrating a first major operation for controlling the vehicular indicator device of FIG. 1, namely for explaining a control operation to display and update first and second threshold value indicator figures on the display screen;

FIG. 12 are views for explaining an example of a hybrid vehicle according to a second embodiment of this invention, FIG. 12(a) being a schematic view showing the arrangement of the hybrid vehicle, while FIG. 12(b) being a view showing a plurality of drive modes of the hybrid vehicle, and operating states of various components of the hybrid vehicle;

FIG. 13 are views for explaining an example of a hybrid vehicle according to a third embodiment of this invention, FIG. 13(a) being a schematic view showing the arrangement of the hybrid vehicle, while FIG. 13(b) being a view showing a plurality of drive modes of the hybrid vehicle, and operating states of various components of the hybrid vehicle;

FIG. 16 is a view showing examples of figures displayed on the display screen of the vehicular indicator device provided for the hybrid vehicle of FIG. 1, which examples correspond to but are different from those shown in FIGS. 6-8.

MODE FOR CARRYING OUT THE INVENTION

Preferred embodiments of the present invention will be described in detail by reference to the drawings.

First Embodiment

Figure 1:
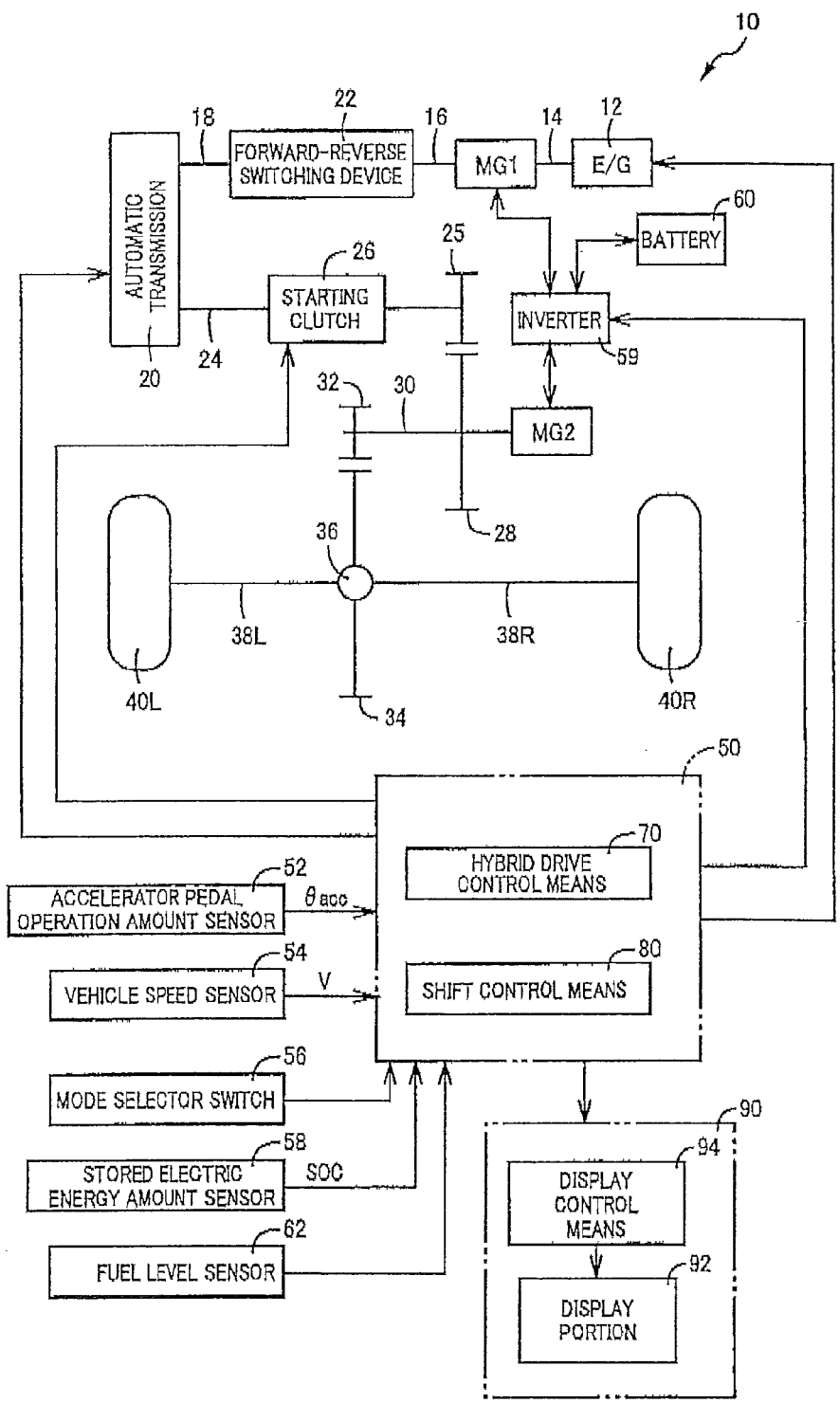
FIG. 1 is a schematic view showing an arrangement of a hybrid vehicle according to one embodiment of this invention, together with major control portions relating to the invention.

FIG. 1 is the schematic view showing an arrangement of a vehicular drive system 10 provided on a hybrid vehicle 8 (hereinafter referred to as "vehicle 8") according to one embodiment of this invention. As shown in FIG. 1, the vehicular drive system 10 is provided with: an engine 12; a first electric motor MG1; an automatic transmission 20; a forward-reverse switching device 22; a first gear 25; a starting clutch 26; a second gear 28; a counter shaft 30; a second electric motor MG2; a third gear 32; and a differential gear device 36. The above-indicated first electric motor MG1 is connected to a crankshaft 14 of the engine 12, and the above-indicated forward-reverse switching device 22 is connected to the first electric motor MG1 through an intermediate shaft 16, and to the automatic transmission 20 through an input shaft 18. The above-indicated starting clutch 26 is disposed between an output shaft 24 of the automatic transmission 20 and the first gear 25, and is configured to be placed in a power transmitting state or a power cutoff state. The above-indicated second gear 28 is mounted on the counter shaft 30, in meshing engagement with the first gear 25. The second electric motor MG2 is connected to the counter shaft 30. The above-indicated third gear 32 is mounted on the counter shaft 30, in meshing engagement with a fourth gear 34 of the differential gear device 36. The engine 12 is an internal combustion engine constructed to generate a drive force by combustion of a fuel. For example, each of the first electric motor MG1 and the second electric motor MG2 is a three-phase synchronous motor and is a motor/generator operable to function as a motor for generating a drive force, and as an electric generator for generating a reaction force. In the thus constructed vehicular drive system 10, the drive force generated by the engine 12 is transmitted to a pair of left and right front drive wheels 40L and 40R through the crankshaft 14, forward-reverse switching device 22, automatic transmission 20, starting clutch 26, first gear 25, second gear 28, counter shaft 30, third gear 32, differential gear device 36, and a pair of left and right axles 38L and 38R connected to the differential gear device 36.

As shown in FIG. 2, the above-indicated forward-reverse switching device 22 is provided with a planetary gear set 42 of a double-pinion type, a forward drive clutch C1 and a reverse drive brake B1, for example. Described more specifically, the planetary gear set 42 has a sun gear connected to the above-indicated intermediate shaft 16, a carrier connected to the input shaft 18 and selectively connected to the intermediate shaft 16 through the forward drive clutch C1, and a ring gear selectively brought into a locked state through the reverse drive brake B1. When the forward drive clutch C1 and the reverse drive brake B1 are both placed in their released states, a power transmitting path between the intermediate shaft 16 and the input shaft 18 is placed in a power cutoff state. When the forward drive clutch C1 is placed in its engaged state while the reverse drive brake B1 is placed in its released state, the forward-reverse switching device 22 is placed in a forward driving state in which a rotary motion of the intermediate shaft 16 is transmitted to the input shaft 18, without reversal of the direction of rotation. When the forward drive clutch C1 is placed in its released state while the reverse drive brake B1 is placed in its engaged state, the forward-reverse switching device 22 is placed in a reverse driving state in which the rotary motion of the intermediate shaft 16 is transmitted to the input shaft 18 such that the direction of rotation of the input shaft 18 is reversed with respect to that of the intermediate shaft 16. For instance, the forward drive clutch C1 and the reverse drive brake B1 are constituted by hydraulically operated frictional coupling devices. It is noted that the forward-reverse switching device 22 may be otherwise constructed, for example, may be provided with a planetary gear set of a single-pinion type.

The automatic transmission 20 according to the present embodiment is a belt-type continuously-variable transmission provided with an input pulley and an output pulley. The input pulley is disposed coaxially with the above-described engine 12, first electric motor MG1 and forward-reverse switching device 22, while the output pulley is disposed coaxially with the above-described starting clutch 26 and first gear 25. The starting clutch 26 is a hydraulically operated frictional coupling device, and functions as a connecting/disconnecting device configured to place a power transmitting path between the output shaft 24 and the first gear 25, in a power transmitting state or a power cutoff state. It is noted that the forward-reverse switching device 22 may be modified so as to have a neutral state, namely, a power cutoff state, so that the forward-reverse switching device 22 is also operable as the above indicated connecting/disconnecting device.

The thus constructed vehicular drive system 10 is provided with an electronic control device 50 configured to implement a hybrid control for driving the vehicle in a selected one of a plurality of drive modes with a selected vehicle drive power source or selected vehicle drive power sources, and a shifting control of the above-described automatic transmission 20. This electronic control device 50 includes a microcomputer configured to perform signal processing operations according to programs stored in a ROM while utilizing a temporary data storage function of a RAM. The electronic control device 50 receives: an output signal of an accelerator pedal operation amount sensor 52 indicative of an operation amount (angle of operation) θacc of an accelerator pedal; an output signal of a vehicle speed sensor 54 indicative of a vehicle running speed V; an output signal of a mode selector switch 56 indicative of a selected vehicle drive mode; an output signal of a stored electric energy amount sensor 58 indicative of an electric energy amount SOC stored in a battery 60 connected to the first electric motor MG1 and second electric motor MG2 such that the electric energy is supplied to and received from the first and second electric motors MG1, MG2 via an inverter 59; and an output signal of a fuel level sensor 62 indicative of an amount of a fuel that can be supplied to the engine 12, namely, that is stored in a fuel tank. The electronic control device 50 receives various other signals such as signals indicative of an operating speed Ne of the engine 12 (hereinafter referred to as "engine speed Ne"), an operating speed Nmg1 of the first electric motor MG1 and an operating speed Nmg2 of the second electric motor MG2, which operating speeds are detected by respective speed sensors. The electronic control device 50 also receives various other kinds of information from various sensors, which are necessary for implementing various controls.

The mode selector switch 56 is a manually operable mode selecting member provided on an instrument panel or a steering wheel, for example, to select one of a power running mode for vehicle running with a high degree of drivability, and an economy running mode for vehicle running with improved fuel economy. The vehicle operator can select a desired one of the power running mode (also called "sporty running mode") and the economy running mode (ECO running mode) by pressing the mode selector switch 56. When none of these power and economy running modes is selected, a normal running mode is established. These power, economy and normal running modes shall be distinguished from vehicle drive modes of the vehicle 8 described below, and will be collectively referred to as "operator-selected vehicle running modes". For instance, different conditions for shifting the automatic transmission 20 are predetermined for the respective power, economy and normal running modes. Described more specifically, when the above-described power running mode is selected, the shifting control of the automatic transmission 20 is implemented according to a power running shift pattern which is formulated such that a target input speed of the automatic transmission 20 corresponding to the vehicle running speed V is maintained at a comparatively high value (such that the automatic transmission 20 is placed in a comparatively low gear position). When the above-described economy running mode is selected, the shifting control of the automatic transmission 20 is implemented according to an economy shift pattern which is formulated such that the target input speed corresponding to the vehicle running speed V is maintained at a comparatively low value (such that the automatic transmission 20 is placed in a comparatively high gear position). The electric energy amount SOC stored in the battery 60 serving as the electric-energy storage device is obtained by calculating from time to time an amount of charging and an amount of discharging of the battery 60, for instance.

As shown in FIG. 1, the electronic control device 50 is provided with hybrid drive control means 70 and shift control means 80 as major control portions. The shift control means 80 is configured to implement the shifting control of the automatic transmission 20 in the parallel HV drive mode in which the engine 12 is used as the vehicle drive power source. For example, the shift control means 80 controls a speed ratio γ of the automatic transmission 20 by adjusting the widths of its pulleys so as to change its input pulley speed according to a predetermined map of a target value of the input pulley speed, which map is defined by an operator's required vehicle drive farce as represented by the accelerator pedal operation amount θacc, and the vehicle running speed V as parameters.

The hybrid drive control means 70 is configured to drive the vehicle 8 in a selected one of a plurality of vehicle drive modes which correspond to respective different combinations of operating states of the engine 12 and the electric motors. MG1 and MG2. As shown in FIG. 3, the plurality of vehicle drive modes include an EV drive mode, a series HV drive mode and a parallel HV drive mode. In the EV drive mode, the vehicle is driven with a drive force of the second electric motor MG2, while the engine 12 is held in its rest state. Namely, in the EV drive mode, the hybrid drive control means 70 commands the starting clutch 26 to be placed in the power cutoff state to disconnect the engine 12 from the power transmitting path, and commands the second electric motor MG2 to be placed in the vehicle driving state to drive the vehicle 8 in the forward or reverse direction. In the series HV drive mode, the second electric motor MG2 is operated to drive the vehicle 8 while the engine 12 is operated for generation of an electric energy. Namely, in the series HV drive mode, the hybrid drive control means 70 commands the engine 12 to be operated to operate the first electric motor MG1 in the electricity generating state (to perform a regenerative operation) while the starting clutch 26 is placed in the power cutoff state to disconnect the engine 12 from the power transmitting path, and commands the second electric motor MG2 to be placed in the vehicle driving state to drive the vehicle 8 in the forward or reverse direction, as in the EV drive mode. The electric energy generated by the first electric motor MG1 is supplied to the second electric motor MG2, or used to charge the battery 60 which is an electric power source for the first electric motor MG1 and second electric motor MG2. Each of the first electric motor MG1 and second electric motor MG2, which are motor/generators, operates as the electric motor when the electric motor MG1, MG2 is placed in the vehicle driving state, or as the electric generator when the electric motor MG1, MG2 is placed in the electricity generating state.

In the parallel HV drive mode, the vehicle is driven with the drive force of the engine 12, or with at least one of the drive forces of the first and second electric motors MG1 and MG2 and the drive force of the engine 12. Namely, in the parallel HV drive mode, the hybrid drive control means 70 commands the starting clutch 26 to be placed in its power transmitting state to connect the engine 12 to the power transmitting path, for using the engine 12 as the vehicle drive power source, or for using the engine 12 and at least one of the first and second electric motors MG1 and MG2 as the vehicle drive power sources, to drive the vehicle 8 in the forward or reverse direction. Described more specifically, the parallel HV drive mode consists of three sub-modes, as indicated in FIG. 3. In a first sub-mode shown in FIG. 3 (parallel HV drive sub-mode in a narrow sense), the hybrid drive control means 70 commands the engine 12 to be operated, and commands the first electric motor MG1 to be placed in the vehicle driving state, so that the vehicle 8 is driven with the engine 12 and first electric motor MG1 being used as the vehicle drive power sources, while the second electric motor MG2 is placed in a free state, without generation of an output torque. In this first sub-mode, the second electric motor MG2 rather than the first electric motor MG1 may be placed in the vehicle driving state, or both of the first and second electric motors MG1 and MG2 may be placed in the vehicle driving state to make the vehicle drive force. In a second sub-mode (series parallel HV drive sub-mode), the hybrid drive control means 70 commands engine 12 to be operated, and commands the second electric motor MG2 to be placed in the vehicle driving state, so that the vehicle 8 is driven with the engine 12 and second electric motor MG2 being used as the vehicle drive power sources, while the first electric motor MG1 is placed in the electricity generating state. The electric power generated by the first electric motor MG1 is supplied to the second electric motor MG2, or stored in the battery 60. In this second sub-mode, the first electric motor MG1 may be placed in the vehicle driving state and used as the vehicle drive power source, while the second electric motor MG2 may be placed in the electricity generating state. In a third sub-mode (engine drive sub-mode), the hybrid drive control means 70 commands the engine 12 to be operated so that the vehicle 8 is driven with only the engine 12 being used as the vehicle drive power source. In this third sub-mode, the first and second electric motors MG1 and MG2 are placed in the free state, without generation of an output torque.

In the above-indicated first sub-mode (parallel HV drive sub-mode in the narrow sense), a larger vehicle drive force can be generated than in the third sub-mode (engine drive sub-mode). The drive state is rapidly switched from the third sub-mode to the first sub-mode by placing the first electric motor MG1 in the vehicle driving state to generate an assisting torque, when the accelerator pedal operation amount θacc is abruptly increased to accelerate the vehicle or raise the running speed of the vehicle. The second sub-mode (series parallel HV drive sub-mode) is similar to the first sub-mode. However, the first sub-mode is established when the electric energy amount SOC stored in the battery 60 is relatively large, while the second sub-mode is established when the electric energy amount SOC is relatively small. In these sub-modes of the parallel HV drive mode, the forward-reverse switching device 22 is placed in the forward driving state or the reverse driving state, depending upon a selected position of a shift lever not shown.

The hybrid drive control means 70 establishes a decelerating drive mode while the accelerator pedal is placed in its non-operated position with its operation amount θacc being substantially zero to decelerate the vehicle. In this decelerating drive mode, the hybrid drive control means 70 commands the starting clutch 26 to be placed in the power cutoff state to disconnect the engine 12 from the power transmitting path, and commands the second electric motor MG2 to be placed in the electricity generating state, so that the vehicle 8 is braked by rotational drag due to a regenerative braking force generated by the second electric motor MG2, while the battery 60 is charged with the electric energy generated by the second electric motor MG2. The vehicle drive modes may further include another drive mode such as a drive mode in which the vehicle is driven with the engine (in the third sub-mode) while the first electric motor MG1 is placed in the electricity generating state to charge the battery 60, for example. The above-indicated decelerating drive mode is similar to the above-indicated EV drive mode in that the starting clutch 26 is placed in the power cutoff state and the engine is halted, and is different from the EV drive mode only in that the directions of the torques generated by the second electric motor MG2 in these decelerating drive mode and EV drive mode are opposite to each other. For this reason, a vehicular indicator device 90 described below indicates the decelerating drive mode as the EV drive mode.

Figures 4, 5:
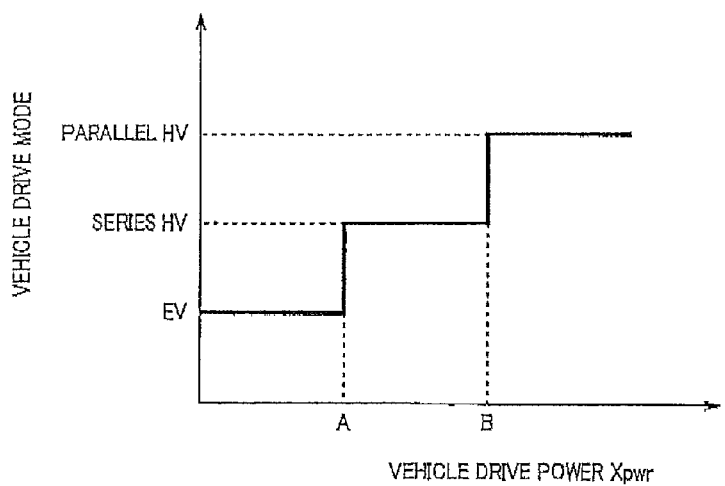
FIG. 4 is a view indicating examples of threshold values of a vehicle drive power used to select one of the above-indicated drive modes of the hybrid vehicle of FIG. 1.
FIG. 5 is a view for explaining a relationship between first and second vehicle drive power threshold values and the vehicle drive modes.

The hybrid drive control means 70 selects one of the above-described EV drive mode, series HV drive mode and parallel HV drive mode, according to a predetermined drive mode switching condition. For example, this drive mode switching condition is a vehicle drive power Xpwr (unit kW, for example), in other words, a drive wheel output force. The vehicle drive power Xpwr can be calculated as a sum of products of the torques and operating speeds of the engine 12 and first and second electric motors MG1 and MG2 which function as the vehicle drive power sources. Alternatively, the vehicle drive power Xpwr may be calculated on the basis of the accelerator pedal operation amount θacc and according to a predetermined relationship between these two values Xpwr and θacc, which is obtained by experimentation. Namely, one of the plurality of vehicle drive modes consisting of the above-described EV drive mode, series HV drive mode and parallel HV drive mode is automatically selected according to the vehicle drive power Xpwr. Described more specifically, threshold values of the vehicle drive power Xpwr used to select one of the plurality of vehicle drive modes are determined by experimentation, for each of the above-described operator-selected vehicle running modes, so as to provide a good compromise between the vehicle drivability and fuel economy. FIG. 4 is the view indicating examples of the threshold values of the vehicle drive power Xpwr, wherein the threshold values are expressed a value with respect to the maximum value of 100 of the vehicle drive power Xpwr. Values A in FIG. 4 are the threshold values of the vehicle drive power Xpwr used to switch the vehicle drive mode between the EV drive mode and the series HV drive mode, that is, first drive power threshold values of the vehicle drive power Xpwr for the vehicle 8. In the example of FIG. 4, the first drive power threshold values A are set to Aeco (=50), Anormal (=30) and Apower (=10) when the operator-selected vehicle running modes are the economy running mode, normal running mode and power running mode (sports mode), respectively. Values B in FIG. 4 are the threshold values of the vehicle drive power Xpwr used to switch the vehicle drive mode between the series HV drive mode and the parallel HV drive mode, that is, second drive power threshold values of the vehicle drive power Xpwr. In the example of FIG. 4, the second drive power threshold values B are set to Beco (=90). Bnormal (=70) and Bpower (=40) when the operator-selected vehicle running modes are the economy running mode, normal running mode and power running mode (sports mode), respectively. Thus, the above-indicated first and second drive power threshold values A and B are set to be lower when the vehicle operator desires the vehicle running with a high degree of drivability, that is, when the operator-selected vehicle running mode is the power running mode, than when the vehicle operator does not desire the vehicle running with the high degree of drivability, than is, than when the operator-selected vehicle running mode is the economy or normal running mode. In all of the operator-selected vehicle running modes, the first drive power threshold values A are set to be no more than the second drive power threshold values B.

FIG. 5 is the view for explaining a relationship between the above-indicated first and second drive power threshold values A and B of the vehicle drive power and the vehicle drive modes. As indicated in FIG. 5, the vehicle drive mode is switched between the EV drive mode and the series HV drive mode, when the vehicle drive power Xpwr is changed across the first drive power threshold value A. For instance, the drive mode of the vehicle 8 is switched from the EV drive mode to the series HV drive mode when the vehicle drive power Xpwr has increased from a value below first drive power threshold value A to a value above the first drive power threshold value A. Conversely, the drive mode of the vehicle 8 is switched from the series HV drive mode to the EV drive mode when the vehicle drive power Xpwr has decreased form a value over first drive power threshold value A to a value below the first drive power threshold value A.

As also indicated in FIG. 5, the vehicle drive mode is switched between the series HV drive mode and the parallel HV drive mode, when the vehicle drive power Xpwr is changed across the second drive power threshold value B. For instance, the drive mode of the vehicle 8 is switched from the series HV drive mode to the parallel HV drive mode when the vehicle drive power Xpwr has increased from a value below second drive power threshold value B to a value above the second drive power threshold value B. Conversely, the drive mode of the vehicle 8 is switched from the parallel HV drive mode to the series HV drive mode when the vehicle drive power Xpwr has decreased form a value over second drive power threshold value B to a value below the second drive power threshold value B. It is noted that a slight amount of hysteresis is provided for each of the above-indicated first and second drive power threshold values A and B, for preventing frequent switching of the vehicle drive mode due to a small amount of change of the vehicle drive power Xpwr.

Referring back to FIG. 1, the vehicle 8 is provided with a vehicular indicator device 90 which is configured to indicate the vehicle drive power Xpwr and the vehicle drive mode selected by the hybrid drive control means 70. This vehicular indicator device 90 is provided with a display portion 92 configured to display images, and a display control portion in the form of display control means 94 configured to control the display portion 92 for displaying the images. The display portion 92 may be a liquid crystal display or any other display device disposed in an operator's compartment of the vehicle 8 so as to permit easy visual perception of images by the vehicle operator. The display control means 94 obtains from time to time the selected vehicle drive mode, the present vehicle drive power Xpwr and the operator-selected vehicle running mode, and controls the display portion 92 to display the images on a display screen 96, on the basis of the obtained selected vehicle drive mode, present vehicle drive power Xpwr and operator-selected vehicle running mode. The images to be displayed on the display screen 96 of the display portion 92 under the control of the display control means 94 will be explained by reference to FIGS. 6-9.

Figure 8:
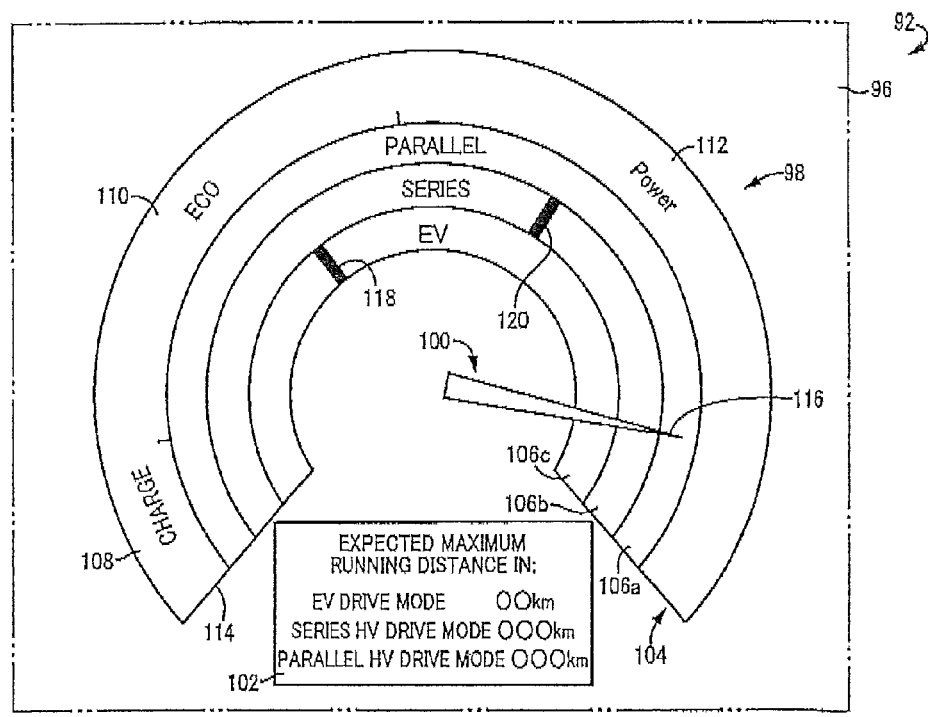
FIG. 8 is a view showing one example of an image displayed on the display screen of the vehicular indicator device provided for the hybrid vehicle of FIG. 1, when a parallel HV drive mode is selected as the drive mode of the hybrid vehicle.

FIGS. 6-8 are the views showing examples of the images displayed on the above-indicated display screen 96. FIG. 6 shows an example of the image displayed when the drive mode of the vehicle 8 is the EV drive mode, and FIG. 7 shows an example of the image displayed when the vehicle drive mode is the series HV drive mode, while FIG. 8 shows an example of the image displayed when the vehicle drive mode is the parallel HV drive mode.

As shown in FIG. 6, for example, the display control means 94 displays, on the display screen 96 of the display portion 92, a background panel figure 98, an pointer figure 100, and an expected maximum running distance indicator region 102. The background panel figure 98, which corresponds to a second figure provided according to this invention, has a generally sectoral shape and is radially divided into a plurality of regions (sub-figures), namely, into a plurality of bands. Described more specifically, the background panel figure 98 consists of a radially outermost arcuate drive power indicator band 104, and a plurality of arcuate drive mode indicator bands 106a, 106b and 106c (hereinafter collectively referred to as "drive mode indicator bands 106", unless otherwise specified) located along, radially inwardly of and concentrically with the drive power indicator band 104. These drive mode indicator bands 106a, 106b, 106c correspond to the respective vehicle drive modes. That is, the parallel HV drive mode indicator band 106a corresponding to the above-described parallel HV drive mode, the series HV drive mode indicator band 106b corresponding to the above-described series HV drive mode, and the EV drive mode indicator band 106c corresponding to the above-described EV drive mode are arranged radially inwardly of the drive power indicator band 104, in this order of description in the radially inward direction. Namely, the background panel figure 98 includes a drive mode indicator region which is divided into the drive mode indicator bands respectively corresponding to the plurality of vehicle drive modes. Further, the drive mode indicator bands 106a, 106b and 106c are displayed in respective different colors determined for the respective vehicle drive modes. For example, the parallel HV drive mode indicator band 106a is displayed in the red color corresponding to the parallel HV drive mode, and the series HV drive mode indicator band 106b is displayed in the blue color corresponding to the series HV drive mode, while the EV drive mode indicator band 106c is displayed in the green color corresponding to the EV drive mode.

In addition, one of the above-described plurality of drive mode indicator bands 106a, 106b and 106c which corresponds to the vehicle drive mode selected by the hybrid drive control means 70 is displayed with a higher degree of brightness. When the selected vehicle drive mode is the parallel HV drive mode, for instance, the parallel HV drive mode indicator band 106a is displayed with a higher degree of brightness, than the other drive mode indicator bands 106b and 106c. When the selected vehicle drive mode is the series RV drive mode, the series HV drive mode indicator band 106b is displayed with a higher degree of brightness, than the other drive mode indicator bands 106a and 106c. When the selected vehicle drive mode is the EV drive mode, the EV drive mode indicator band 106c is displayed with a higher degree of brightness, than the other drive mode indicator bands 106a and 106b. For easier understanding of the drive mode indicator bands 106 by the vehicle operator, the parallel HV drive mode indicator band 106a is labeled "PARALLEL", and the series HV drive mode indicator band 106b is labeled "SERIES", while the EV drive mode indicator band 106c is labeled "EV".

The above-indicated drive power indicator band 104, which is provided for indicating the vehicle drive power Xpwr, consists of a CHARGE indicator area 108 labeled "CHARGE", an ECO indicator area 110 labeled "ECO", and a Power indicator area 112 labeled "Power". The above-indicated CHARGE indicator area 108 indicates that the vehicle drive power Xpwr is in the direction of regenerative operation, that is, in the negative direction. The above-indicated ECO indicator area 110 indicates that the vehicle drive power Xpwr is in the vehicle driving direction, that is, in the positive direction, and is comparatively low and within a predetermined output range recommended for maintaining a comparatively high degree of fuel economy of the vehicle. The above-indicated Power indicator area 112 indicates that the vehicle drive power Xpwr is in the vehicle driving direction, that is, in the positive direction, and is comparatively high, namely, higher than the upper limit of the above-indicated recommended high fuel economy range. That is, the vehicle drive power Xpwr indicated by the sectoral drive power indicator band 104 increases as this sectoral band 104 extends in the clockwise direction from one end 114 of the CHARGE indicator area 108 along the arc of the sectoral band 104.

The above-indicated pointer figure 100, which corresponds to a first figure provided according to this invention, takes the form of a needle a state of indication of which changes according a change of the vehicle drive power Xpwr within the display screen 96. Described more specifically, the pointer figure 100 is controlled by the display control means 94 such that the pointer figure 100 is continuously pivoted in the clockwise direction (in the direction of an arrow AR01 indicated in FIG. 6) with an increase of the vehicle drive power Xpwr, about its pivot axis lying on a center of curvature of the drive power indicator band 104 and drive mode indicator bands 106, that is, about a center of curvature of the background panel figure 98 (about its pivoting center point). Thus, the pointer figure 100, which is pivotable about the center of curvature of the background panel figure 98 displayed on the above-indicated display screen 96, points a position within the drive power indicator band 104, which position represents the vehicle drive power Xpwr. Further the pointer figure 100 is controlled by the display control means 94 such that the length of the pointer figure 100 from its pivot axis is changed according to the drive mode of the vehicle 8 selected by the hybrid drive control means 70. Thus, the pointer figure 100, the length of which from its pivoting axis is variable, points one of the above-indicated plurality of drive mode indicator bands 106a, 106b and 106c which corresponds to the vehicle drive mode selected by the hybrid drive control means 70. In other words, the display control means 94 determines the length of the pointer figure 100 from its pivot axis on the basis of the selected vehicle drive mode to a pointing end portion 116, so that the pointer figure 100 points one of the drive mode indicator bands 106a, 106b and 106c within the background panel figure 98, which corresponds to a predetermined region for the selected vehicle drive mode. When the selected vehicle drive mode is the parallel HV drive mode, for example, the pointer figure 100 points the parallel HV drive mode indicator band 106a. When the selected vehicle drive mode is the series HV drive mode, the pointer figure 100 points the series HV drive mode indicator band 106b. When the selected vehicle drive mode is the EV drive mode, for example, the pointer figure 100 points the EV drive mode indicator band 106c. In this respect, it is noted that the display control means 94 displays the pointer figure 100 on the display screen 96 such that an end portion (the pointing end portion 116) of the pointer figure 100 is superimposed on the background panel figure 98, and such that the pointer figure 100 is displayed in the color corresponding to the vehicle drive mode selected by the hybrid drive control means 70.

Further, the display control means 94 displays the expected maximum running distance indicator region 102 on the display screen 96 of the display portion 92, such that this running distance indicator region 102 indicates expected maximum running distances of the vehicle when the vehicle is driven in the EV drive mode, series HV drive mode and parallel HV drive mode. For the running distance indicator region 102 to indicate the expected maximum running distances, the display control means 94 calculates from time to time the expected maximum running distances of the vehicle in the respective drive modes, on the basis of control parameters such as the electric energy amount SOC stored in the battery 60, the amount of the fuel contained in the above-indicated fuel tank, hysteresis data regarding the accelerator pedal operation amount θacc, and an average fuel consumption amount, and according to a relationship among those control parameters and the expected maximum running distances obtained experimentally. Namely, the display control means 94 estimates the maximum possible values of distance of the future running of the vehicle.

Examples of the indication by the pointer figure 100 will be described by reference to FIGS. 6-8. When the vehicle drive mode selected by the hybrid drive control means 70 is the EV drive mode, for example, the display control means 94 displays the pointer figure 100 such that the angle of pivoting of the pointer figure 100 about its pivot axis corresponds to the vehicle drive power Xpwr while the pointer figure 100 has the smallest length so that the pointing end portion 116 is superimposed on the EV drive mode indicator band 106c, as indicated in FIG. 6. Further the display control means 94 displays the pointer figure 100 in the color corresponding to the EV drive mode, that is, in the green color.

When the vehicle drive mode selected by the hybrid drive control means 70 is the series HV drive mode, the display control means 94 displays the pointer figure 100 such that the angle of pivoting of the pointer figure 100 about its pivot axis corresponds to the vehicle drive power Xpwr while the pointer figure 100 has the length larger than that of FIG. 6 so that the pointing end portion 116 is superimposed on the series HV drive mode indicator band 106b, as indicated in FIG. 7. Further, the display control means 94 displays the pointer figure 100 in the color corresponding to the series HV drive mode, that is, in the blue color.

When the vehicle drive mode selected by the hybrid drive control means 70 is the parallel HV drive mode, the display control means 94 displays the pointer figure 100 such that the angle of pivoting of the pointer figure 100 about its pivot axis corresponds to the vehicle drive power Xpwr while the pointer figure 100 has the length larger than that of FIG. 7 so that the pointing end portion 116 is superimposed on the parallel HV drive mode indicator band 106a, as indicated in FIG. 8. Further the display control means 94 displays the pointer figure 100 in the color corresponding to the parallel HV drive mode, that is, in the red color.

As described above, the display control means 94 displays the figures indicating a running state of the vehicle as represented by the vehicle drive power Xpwr and the selected vehicle drive mode, in a two-dimensional coordinate system on the display screen 96, which coordinate system is defined by the vehicle drive power Xpwr and the selected vehicle drive mode.

Figure 9A:
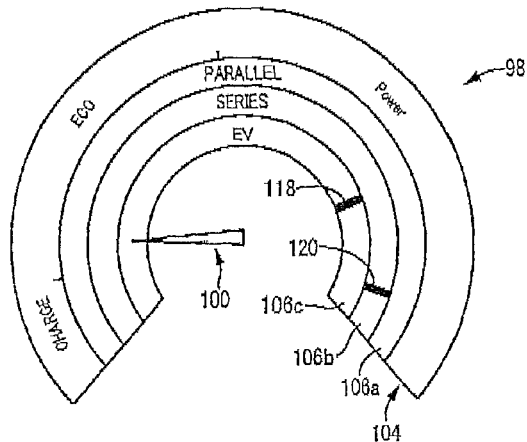
FIG. 9 are views showing examples of the image displayed on the display screen of a display portion of the vehicular indicator device provided for the hybrid vehicle of FIG. 1, for comparison of the figures displayed in different operator selected vehicle running modes.
Figure 9B:
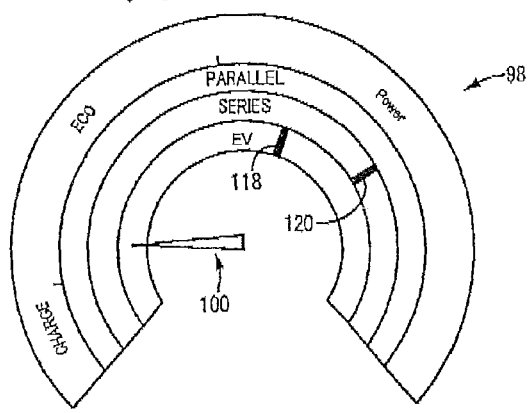
Figure 9C:
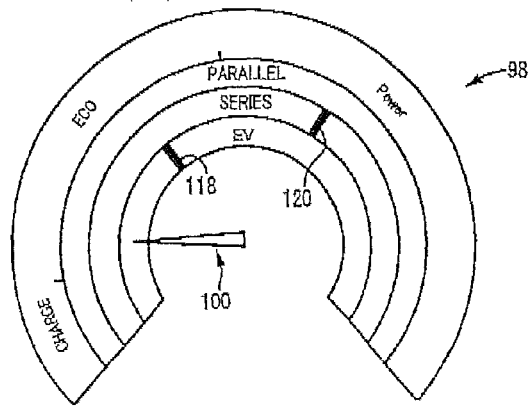

FIG. 9 are the views showing examples of the image displayed on the display screen 96 of the display portion 92, for comparison of the images displayed in the different operator-selected vehicle running modes. FIG. 9(a) shows the image displayed when the above-described economy running mode is selected by the vehicle operator, and FIG. 9(b) shows the image displayed when the above-described normal running mode is selected, while FIG. 9(c) shows the image displayed when the above-described power running mode is selected.

The display control means 94 displays a first threshold value indicator figure 118 indicative of the above-described first drive power threshold value A, at a position within the above-described display screen 96, which position corresponds to the first drive power threshold value A, as shown in FIG. 9. The display control means 94 further displays a second threshold value indicator figure 120 indicative of the above-described second drive power threshold value B, at a position within the display screen 96, which position corresponds to the second drive power threshold value B. These first and second threshold value indicator figures 118 and 120 correspond to a third figure provided according to the present invention. Described more specifically, the first threshold value indicator figure 118 is a line dividing the EV drive mode indicator band 106c into two arcuate areas, while the second threshold value indicator figure 120 is a line dividing the series HV drive mode indicator band 106b into two arcuate areas. In each of the operator-selected vehicle running modes, the second drive power threshold value B is larger than the first drive power threshold value A, as indicated in FIGS. 4 and 5, so that the position of display of the second threshold value indicator figure 120 is displayed to be spaced apart from the position of display of the first threshold value indicator figure 118 is displayed, in the clockwise direction about the pivot axis of the painter figure 100, as shown in FIGS. 9(*a*)-9(*c*). Further, the first and second drive power threshold values A and B decrease in steps as the operator-selected vehicle running mode is changed from the economy running mode to the normal running mode, and from the normal running mode to the power running mode, so that the positions of display of the first and second threshold value indicator figures 118 and 120 are moved in the counterclockwise direction about the pivot axis of the pointer figure 100, as the operator-selected vehicle running mode is changed from the economy running mode to the normal running mode, and from the normal running mode to the power running mode.

FIG. 10 is the flow chart illustrating a first major operation for controlling the vehicular indicator device 90, namely, for explaining a control operation to display and update the first and second threshold value indicator figures 118 and 120 on the display screen 96. This control operation is repeatedly performed with an extremely short cycle time of several milliseconds to several tens of milliseconds. The control operation illustrated in FIG. 10 is performed alone, or concurrently with any other control operation. The display control means 94 included in the vehicular indicator device 90 displays and updates the first and second threshold value indicator figures 118 and 120 according to the flow chart of FIG. 10. Namely, all steps illustrated in FIG. 10 correspond to the display control means 94.

In step SA1 ("step" being hereinafter omitted) in FIG. 10, the display control means 94 obtains the vehicle running mode selected by the vehicle operator, for instance, the power running mode for vehicle running with a high degree of drivability (a large drive force), or the economy running mode far vehicle running with improved fuel economy. More specifically, the display control means 94 obtains the present operator-selected vehicle running mode. Namely, the display control means 94 determines one of the economy, normal and power running modes which is presently selected. This determination is made on the basis of the output signal of the mode selector switch 56. Then, SA2 is executed.

In SA2, the display control means 94 determines whether the vehicle running mode obtained in SA1 is the high drivability running mode, that is, whether the operator-selected vehicle running mode is the power running mode. If an affirmative determination is obtained in SA2, that is, if the operator-selected vehicle running mode is the power running mode, the control flow goes to SA3. If a negative determination is obtained in SA2, the control flow goes to SA5.

In SA3, the display control means 94 obtains the above-described first and second drive power threshold values A (=Apower) and B (=Bpower) for the power running mode. The first and second drive power threshold values A and B are determined for the respective different operator-selected vehicle running modes as shown in FIG. 4, and are stored in a suitable memory device, and the display control means 94 obtains the first and second drive power threshold values A and B corresponding to the present operator-selected vehicle running mode from the memory device. SA3 is followed by SA4.

In SA4, the display control means 94 displays the first threshold value indicator figure 118, at the position within the display screen 96, which position corresponds to the first drive power threshold value A (=Apower) obtained in SA3, and displays the second threshold value indicator figure 120, at the position corresponding to the second drive power threshold value B (Bpower) obtained in SA3. FIG. 9(*c*) indicates examples of the positions at which the first and second threshold value indicator figures 118 and 120 are displayed in the above-described power running mode. If the indicator figures 118 and 120 have already been displayed at the other positions within the display screen 96 upon implementation of SA4, the positions of the indicator figures 118 and 120 are updated.

In SA5, the display control means 94 determines whether the vehicle running mode obtained in SA1 is the high fuel economy running mode, that is, whether the operator-selected vehicle running mode is the economy running mode. If an affirmative determination is obtained in SA5, that is, if the operator-selected vehicle running mode is the economy running mode, the control flow goes to SA6. If a negative determination is obtained in SA5, the control flow goes to SA.

In SA6, the display control means 94 obtains the above-described first and second drive power threshold values A (=Aeco) and B (=Beco) for the economy running mode. SA6 is followed by SA7.

In SA7, the display control means 94 displays the first threshold value indicator figure 118, at the position within the display screen 96, which position corresponds to the first drive power threshold value A (=Aeco) obtained in SA6, and displays the second threshold value indicator figure 120, at the position corresponding to the second drive power threshold value B (=Beco) obtained in SA6. FIG. 9(*a*) indicates examples of the positions at which the first and second threshold value indicator figures 118 and 120 are displayed in the economy running mode. If the indicator figures 118 and 120 have already been displayed at the other positions within the display screen 96 upon implementation of SA7, the positions of the indicator figures 118 and 120 are updated.

In SA8, the display control means 94 obtains the above-described first and second drive power threshold values A (=Anormal) and B (=Bnormal) for the normal running mode. SA is followed by SA9.

In SA9, the display control means 94 displays the first threshold value indicator figure 118, at the position within the display screen 96, which position corresponds to the first drive power threshold value A (=Anormal) obtained in SA8, and displays the second threshold value indicator figure 120, at the position corresponding to the second drive power threshold value B (=Bnormal) obtained in SA8. FIG. 9(*b*) indicates examples of the positions at which the first and second threshold value indicator figures 118 and 120 are displayed in the normal running mode. If the indicator figures 118 and 120 have already been displayed at the other positions within the display screen 96 upon implementation of SA9, the positions of the indicator figures 118 and 120 are updated.

Figure 11:
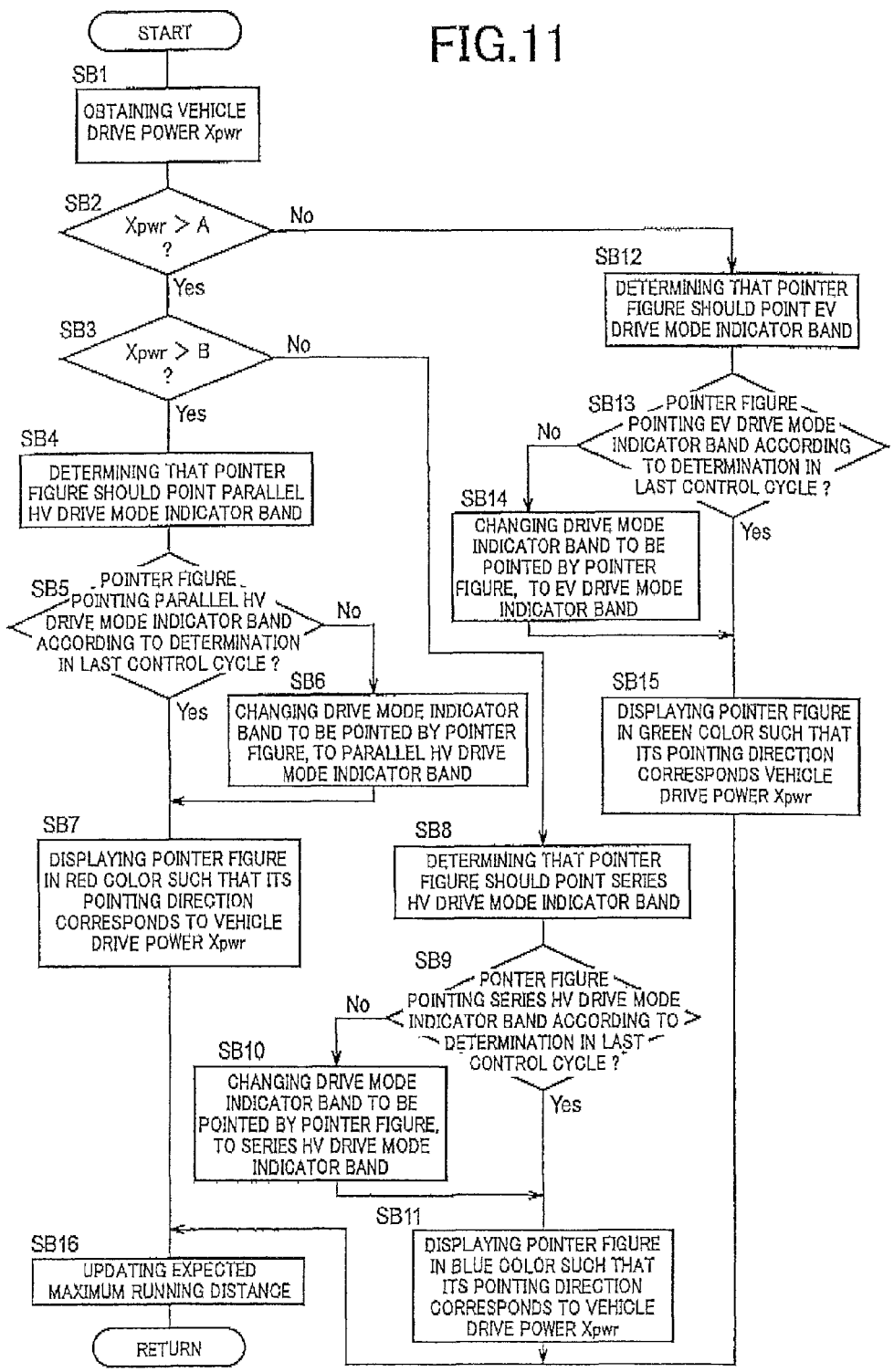
FIG. 11 is a flow chart illustrating a second major operation for controlling the vehicular indicator device of FIG. 1, namely, for explaining a control operation to display and update a pointer figure on the display screen.

FIG. 11 is the flow chart illustrating a second major operation for controlling the vehicular indicator device 90, namely, for explaining a control operation to display and update the pointer figure 100 on the display screen 96. This control operation is repeatedly performed with an extremely short cycle time of several milliseconds to several tens of milliseconds. The control operation illustrated in FIG. 11 is performed alone, or concurrently with any other control operation. The display control means 94 displays and updates the pointer figure 100 according to the flow chart of FIG. 11. Namely, all steps illustrated in FIG. 11 correspond to the display control means 94.

In SB1 in FIG. 11, the display control means 94 obtains the drive power of the vehicle 8, that is, the above-described vehicle drive power Xpwr. SB1 is followed by SB2.

In SB2, the display control means 94 determines whether the vehicle drive power Xpwr obtained in SB1 is larger than the above-described first drive power threshold value A. If an affirmative determination is obtained in SB2, that is, if the obtained vehicle drive power Xpwr is larger than the first drive power threshold value A, the control flow goes to SB3. If a negative determination is obtained in SB2, the control flow goes to SB12.

In SB3, the display control means 94 determines whether the vehicle drive power Xpwr obtained in SB1 is larger than the above-described second drive power threshold value B. If an affirmative determination is obtained in SB3, that is, if the obtained vehicle drive power Xpwr is larger than the second drive power threshold value B, the control flow goes to SB4. If a negative determination is obtained in SB8 the control flow goes to SB8. The present flow chart may be modified such that the above-described steps SB2 and SB3 are replaced by steps which are formulated to implement SB12 when the EV drive mode is selected by the hybrid drive control means 70, to implement SB8 when the series HV drive mode is selected by the hybrid drive control means 70, and to implement SB4 when the parallel HV drive mode is selected by the hybrid drive control means 70 without determinations in SB2 and SB3.

In SB4, the display control means 94 determines that the pointer figure 100 should point the parallel HV drive mode indicator band 106a. SB4 is followed by SB5.

In SB5, the display control means 94 determines whether the pointer figure 100 is presently pointing the parallel HV drive mode indicator band 106a, according to the determination made in the last cycle of control operation of the flow chart of FIG. 11. Namely, the display control means 94 determines whether the determination that the pointer figure 100 should point the parallel HV drive mode indicator band 106a was made in the last cycle of control operation. If an affirmative determination is obtained in SB5, that is, if the pointer figure 100 is presently pointing the parallel HV drive mode indicator band 106a according to the determination made in the last cycle, the control flow goes to SB7. If a negative determination is obtained in SB5, the control flow goes to SB6.

In SB6, the display control means 94 determines that the drive mode indicator band to be pointed by the pointer figure 100 should be changed to the parallel HV drive mode indicator band 106a. Namely, the display control means 94 determines the length of the pointer figure 100 from the above-indicated pivot axis to the end of the painting end portion 116 such that the pointer figure 100 to be displayed in the following step SB7 corresponds to the parallel HV drive mode, more specifically, such that the pointing end portion 116 of the pointer figure 100 is superimposed on (overwrapped with) in the display screen 96, the parallel HV drive mode indicator band 106a. SB6 is followed by SB7.

In SB7, the display control means 94 updates a mode of display of the pointer figure 100. Namely, the display control means 94 displays the pointer figure 100 on the display screen 96 such that the painting direction of the pointer figure 100 corresponds to the vehicle drive power Xpwr obtained in SB1. Described more specifically, the display control means 94 displays the pointer figure 100 such that the angle of pivoting of the pointer figure 100 about its pivot axis corresponds to the vehicle drive power Xpwr. At this time, the length of the pointer figure 100 from its pivot axis to the end of the pointing end portion 116 remains almost unchanged from that in the last control cycle of this flowchart. If the length is changed in SB6 as described above, the pointer figure 100 is displayed with the changed length. In SB7, the pointer figure 100 is displayed in the color corresponding to the parallel HV drive mode, that is, displayed in the red color SB7 is followed by SB16.

In SB8, the display control means 94 determines that the pointer figure 100 should point the series HV drive mode indicator band 106b. SB8 is followed by SB9.

In SB9, the display control means 94 determines whether the pointer figure 100 is presently pointing the series V drive mode indicator band 106b, according to the determination made in the last cycle of control operation of the flow chart of FIG. 11. Namely, the display control means 94 determines whether the determination that the pointer figure 100 should point the series HV drive mode indicator band 106b was made in the last cycle of control operation. If an affirmative determination is obtained in SB9, that is, if the pointer figure 100 is presently pointing the series HV drive mode indicator band 106b according to the determination made in the last cycle, the control flow goes to SB11. If a negative determination is obtained in SB9, the control flow goes to SB10.

In SB10, the display control means 94 determines that the drive mode indicator band to be painted by the pointer figure 100 should be changed to the series HV drive mode indicator band 106b. Namely, the display control means 94 determines the length of the pointer figure 100 from the above-indicated pivot axis to the end of the pointing end portion 116 such that the pointer figure 100 to be displayed in the following step SB11 corresponds to the series HV drive mode, more specifically, such that the pointing end portion 116 of the pointer figure 100 is superimposed on the series HV drive mode indicator band 106b in the display screen 96. SB10 is followed by SB11.

In SB11, the display control means 94 updates the mode of display of the pointer figure 100. Namely, the display control means 94 displays the pointer figure 100 on the display screen 96 such that the pointing direction of the pointer figure 100 corresponds to the vehicle drive power Xpwr obtained in SB1. Described more specifically the display control means 94 displays the painter figure 100 such that the angle of pivoting of the pointer figure 100 about its pivot axis corresponds to the vehicle drive power Xpwr. At this time, the length of the pointer figure 100 from its pivot axis to the end of the pointing end portion 116 remains almost unchanged from that in the last control cycle of this flowchart. If the length is changed in SB10 as described above, the pointer figure 100 is displayed with the changed length. In SB11, the pointer figure 100 is displayed in the color corresponding to the series HV drive mode, that is, displayed in the blue color SB11 is followed by SB16.

In SB12, the display control means 94 determines that the pointer figure 100 should point the EV drive mode indicator band 106c. SB12 is followed by SB13.

In SB13, the display control means 94 determines whether the pointer figure 100 is presently pointing the EV drive mode indicator band 106c, according to the determination made in the last cycle of control operation of the flow chart of FIG. 11. Namely, the display control means 94 determines whether the determination that the pointer figure 100 should point the EV drive mode indicator band 106c was made in the last cycle of control operation. If an affirmative determination is obtained in SB13, that is, if the pointer figure 100 is presently pointing the EV drive mode indicator band 106c according to the determination made in the last cycle, the control flow goes to SB15. If a negative determination is obtained in SB13, the control flow goes to SB14.

In SB14, the display control means 94 determines that the drive mode indicator band to be pointed by the pointer figure 100 should be changed to the EV drive mode indicator band 106c. Namely, the display control means 94 determines the length of the pointer figure 100 from the above-indicated pivot axis to the end of the pointing end portion 116 such that the pointer figure 100 to be displayed in the following step SB15 corresponds to the EV drive mode, more specifically, such that the pointing end portion 116 of the pointer figure 100 is superimposed on the EV drive mode indicator band 106c in the display screen 96. SB14 is followed by SB15.

In SB15, the display control means 94 updates the mode of display of the pointer figure 100. Namely, the display control means 94 displays the pointer figure 100 on the display screen 96 such that the pointing direction of the pointer figure 100 corresponds to the vehicle drive power Xpwr obtained in SB1. Described more specifically, the display control means 94 displays the pointer figure 100 such that the angle of pivoting of the pointer figure 100 about its pivot axis corresponds to the vehicle drive power Xpwr. At this time, the length of the pointer figure 100 from its pivoting center point to the end of the pointing end portion 116 remains almost unchanged from that in the last control cycle of this flowchart. If the length is changed in SB14 as described above, the pointer figure 100 is displayed with the changed length. In SB15, the pointer figure 100 is displayed in the color corresponding to the EV drive mode, that is, displayed in the green color. SB15 is followed by SB16.

In SB16, the display control means 94 calculates the expected maximum running distance of the vehicle in the relevant one of the EV drive mode, series HV drive mode and parallel HV drive mode, and indicates or updates the calculated expected maximum running distance in the above-described expected maximum running distance indicator region 102.

The vehicular indicator device 90 according to the present embodiment described above is configured to display the vehicle drive mode selected by the hybrid drive control means 70, and the vehicle drive power Xpwr. Described more specifically, the vehicular indicator device 90 indicates the running state of the vehicle as represented by the vehicle drive power Xpwr and the selected vehicle drive mode, in a two-dimensional coordinate system on the display screen 96, which coordinate system is defined by the vehicle drive power Xpwr and the selected vehicle drive mode. Thus, the above-indicated running state of the vehicle is indicated in the two-dimensional coordinate system defined by parameters in the form of the vehicle drive power Xpwr and the selected vehicle drive mode, such that the vehicular indicator device 90 permits concurrent indication of the vehicle drive power Xpwr and the selected vehicle drive mode, without the indication of the selected vehicle drive mode being influenced by a change of the vehicle drive power Xpwr. Namely, the vehicle drive power Xpwr and the selected vehicle drive mode can be concurrently displayed on the display screen 96. Accordingly, the vehicular indicator device 90 permits indication of the selected drive mode and the vehicle drive power Xpwr, with a high degree of visual perceptibility by the vehicle user.

The vehicular indicator device 90 according to the present embodiment is further configured to display on the above-described display screen 96, the pointer figure 100 the pointing direction of which changes with a change of the vehicle drive power Xpwr, and the background panel figure 98 divided into the bands respectively corresponding to the above-described plurality of vehicle drive modes, the pointer figure 100 painting one of the bands within the background panel figure 98 which corresponds to the above-described selected vehicle drive mode. Accordingly, the vehicle user observing the pointer figure 100 can concurrently recognize the selected vehicle drive mode and the vehicle drive power Xpwr. Namely, the vehicle user tracing the pointer figure 100 can easily understand the selected vehicle drive mode and the vehicle drive power Xpwr.

The display control means 94 according to the present embodiment is also configured to display the first threshold value indicator figure 118 indicative of the first drive power threshold value A, at a position within the above-described display screen 96 which corresponds to the first drive power threshold value A, and to display the second threshold value indicator figure 120 indicative of the second drive power threshold value B, at a position within the display screen 96 which corresponds to the second drive power threshold value B. Accordingly, the vehicle user can expect a condition in which the selected vehicle drive mode is changed, so that the vehicle user can easily manipulate the vehicle for driving the vehicle in a desired condition. For instance, the vehicle user can easily visually perceive the timing of change of the presently selected vehicle drive mode to another, so that the vehicle operator who desires a high degree of fuel economy of the vehicle can easily improve the fuel economy. When the power running mode (sporty running mode) is selected by the vehicle operator, the vehicle operator can visually perceive a change to the parallel HV drive mode for a higher degree of vehicle acceleration, at a lower value of the vehicle drive power Xpwr, than in another operator-selected vehicle running mode.

The present embodiment is further configured such that the different colors of display are predetermined respectively for the above-described plurality of vehicle drive modes, and the pointer figure 100 is displayed in one of the different colors of display which corresponds to the vehicle drive mode selected by the hybrid drive control means 70. In the vehicular indicator device according to this embodiment, the visual perceptibility of the selected vehicle drive mode can be made higher than in a vehicular indicator device in which the color of display of the pointer figure 100 does not change. For instance, the visual perceptibility is improved regarding a change between the operated and non-operated states of the engine 12 as a result of a change of the selected vehicle drive mode, so that the vehicle operator is prompted to manipulate the vehicle so as to improve its fuel economy.

The present embodiment is also configured such that the display control means 94 calculates the expected maximum running distance of the hybrid vehicle in each of the plurality of vehicle drive modes, on the basis of the electric energy amount SOC stored in the battery 60, and the remaining fuel to be supplied to the engine 12, and indicates or updates from time to time the calculated expected maximum running distance on the above-described display screen 96. Accordingly, the vehicle user (operator) drives the vehicle 8 while recognizing the indicated expected maximum running distance, facilitating the manipulation of the vehicle 8 so as to improve the fuel economy. Where the vehicle 8 is a so-called "plug-in hybrid vehicle" that can be charged by an external electric power source, the vehicle 8 may be used as an electric vehicle. In this case, the indication of the expected maximum running distance of the vehicle 8 without consumption of the fuel for the engine is considerably advantageous to the vehicle operator.

The present embodiment is further configured such that the background panel figure 98 has the arcuate drive power indicator band 104 for indicating the vehicle drive power Xpwr, and the plurality of arcuate drive mode indicator bands 106a, 108b and 106c corresponding to the plurality of drive modes and, located along and concentrically with the drive power indicator band 104, and such that the pointer figure 100 takes the form of a needle which is pivoted about its pivot axis lying on the center of curvature of the drive power indicator band 104 and the drive mode indicator bands 106a, 106b and 106c, to point a position within the drive power indicator band 104, which position represents the vehicle drive power Xpwr, the needle being displayed such that the length of the needle from its pivot axis (pivoting center point) is changed to point one of the plurality of drive mode indicator bands 106a, 106b and 106c which corresponds the above-described selected vehicle drive mode. Thus, the background panel figure 98 and the pointer figure 100 cooperate to constitute an indicator meter such as ones commonly provided on vehicles, which permits the operator of the vehicle 8 to easily and quickly recognize the selected vehicle drive mode and the vehicle drive power Xpwr.

The present embodiment is also configured such that the bands of the background panel figure 98 corresponding to the respective vehicle drive modes, that is, the drive mode indicator bands 106a, 106b and 106c are arranged in the direction intersecting the direction of pivoting of the pointer figure 100 (in the direction of the arrow AR01 indicated in FIG. 6) with a change of the vehicle drive power Xpwr, as shown in FIG. 6, for example. Further, the vehicular indicator device 90 displays the pointer figure 100 in the form of a needle such that the pointing end portion 116 of the pointer figure 100 is located within the band corresponding to the selected vehicle drive mode. Thus, the vehicular indicator device 90 is configured to permit the pointing end portion 116 of the pointer figure 100 to concurrently paint the selected vehicle drive mode and the vehicle drive power Xpwr, so that the vehicle user (operator) can easily recognize the selected vehicle drive mode and the vehicle drive power Xpwr which are pointed by the pointing end portion 116.

The present embodiment is also configured such that the plurality of drive mode indicator bands 106 are arranged adjacent to each other in the radial direction, as shown in FIG. 6. Accordingly, the vehicular indicator device 90 permits the vehicle operator to easily recognize successive changes of the vehicle drive mode from the EV drive mode to the series HV drive mode, and from the series HV drive mode to the parallel HV drive mode, together with the vehicle drive power Xpwr.

The present embodiment is, as shown in FIG. 9, further configured such that the position at which the first threshold value indicator figure 118 is displayed when the above-described operator-selected vehicle running mode is the economy running mode is spaced apart in the clockwise direction from the position at which the indicator figure 118 is displayed when the operator-selected vehicle running mode is the normal running mode or the power running mode, so that the vehicle operator can easily recognize that the range of the vehicle drive power Xpwr in which the vehicle can be driven in the EV drive mode is broadest in the economy vehicle running mode.

Other embodiments of this invention will be described. In the following description, the same reference signs will be used to identify the same elements in the different embodiments, which will not be described redundantly.

Second Embodiment

FIG. 12 are views for explaining another example of a vehicular drive device to which the present invention is suitably applicable. FIG. 12(a) is a schematic view showing the arrangement of the vehicular drive system, while FIG. 12(b) is a view for explaining a plurality of drive modes of the vehicular drive system. In this vehicular drive system 150, the above-described engine 12, a first clutch 152, the first electric motor MG1, a second clutch 154 and the second electric motor MG2 are disposed in series coaxially with each other, and an output gear 156 interposed between the second clutch 154 and the second electric motor MG2 is held in meshing engagement with the above-described fourth gear 34. Like the vehicular drive system in the first embodiment described above, the present vehicular drive system 150 is also configured to selectively establish one of the EV drive mode, the series HV drive mode, the parallel HV drive mode having the three sub-modes, and the decelerating drive mode, as shown in FIG. 12(b). The above-described hybrid drive control means 70 selects one of those drive modes. At the same time, the vehicle drive power Xpwr and the vehicle drive mode selected by the hybrid drive control means 70 are indicated according to the flow charts of FIGS. 10 and 11. The present second embodiment provides substantially the same advantages as the first embodiment described above.

In this embodiment, the vehicle cannot be driven in the reverse direction in the engine drive mode (in the third sub-mode of the parallel HV drive mode), so that the vehicle is driven in the reverse direction in the EV drive mode or the series EV drive mode.

Third Embodiment

FIG. 13 are the views for explaining a further example of a vehicular drive system to which the present invention is suitably applicable. FIG. 13(a) is the schematic view showing an arrangement of the vehicular drive system, while FIG. 13(b) is the view for explaining a plurality of drive modes of the vehicular drive system. In this vehicular drive system 160, the above-described engine 12, first electric motor MG1 and second electric motor MG2, and an output gear 164 are connected to each other through a planetary gear set 162, and a first clutch 166 is interposed between the engine 12 and the first electric motor MG1, while the first electric motor MG1 is connected to a ring gear of the planetary gear set 162 through a second clutch 168. The ring gear of the planetary gear set 162 can be fixed to a stationary member through a brake 170. The second electric motor MG2 is connected to a sun gear of the planetary gear set 162, and the output gear 164 is connected to a carrier of the planetary gear set 162, while the output gear 164 is held in meshing engagement with the above-described second gear 28.

Like the vehicular drive system according to the first embodiment described above, the present vehicular drive system 160 is configured to selectively establish one of the EV drive mode, the series HV drive mode, the parallel HV drive mode, and the decelerating drive mode, as shown in FIG. 18(b). The above-described hybrid drive control means 70 selects one of those drive modes. At the same time, the vehicle drive power Xpwr and the vehicle drive mode selected by the hybrid drive control means 70 are indicated according to the flow charts of FIGS. 10 and 11. The present third embodiment provides substantially the same advantages as the first embodiment described above.

In the EV drive mode shown in FIG. 18(b), the vehicle is driven by the second electric motor MG2 placed in its vehicle driving state with the brake 170 being placed in its engaged state. However, the vehicle may be driven in the EV drive mode, by the first and second electric motors MG1 and MG2 placed in the vehicle driving state, while the brake 170 is held in its released state. The parallel HV drive mode has the two sub-modes. The first sub-mode is a parallel HV drive mode in a narrow sense, in which the vehicle is driven with both of the engine 12 and the second electric motor MG2 being used as the vehicle drive power sources. The second sub-mode is a series/parallel HV drive mode, which is different from the first sub-mode in that the first electric motor MG1 is operated as an electric generator for generating an electric energy. The vehicle may be driven in the reverse direction in the EV drive mode or the series HV drive mode.

While the embodiments of this invention have been described in detail by reference to the drawings, for illustrative purpose only, it is to be understood that the invention may be embodied with various changes and improvements which may occur to those skilled in the art.

For example, the above-described first through third embodiments wherein the hybrid drive control means 70 selects one of the three vehicle drive modes consisting of the EV drive mode, series HV drive mode and parallel HV drive mode may be modified such that the hybrid drive control means 70 selects one of two vehicle drive modes or one of four or more vehicle drive modes.

While the above-described first through third embodiments are configured such that one of the above-described EV drive mode, series HV drive mode and parallel HV drive mode is selected on the basis of the vehicle drive power Xpwr, the vehicle drive mode may be selected on the basis of another quantity indicative of the running condition of the vehicle such as the accelerator pedal operation amount θacc or the vehicle running speed V, in place of or in addition to the vehicle drive power Xpwr.

In the above-described first through third embodiments, the vehicular indicator device 90 is configured to display the first threshold value indicator figure 118 and the second threshold value indicator FIG. 120. However, the vehicular indicator device 90 may be configured not to display one or both of those two threshold value indicator figures 118 and 120.

Although the display portion 92 in the above-described first, second and third embodiments is configured to display the expected maximum running distance indicator region 102 on the display screen 96, the display portion 92 may be configured not to display the expected maximum running distance indicator region 102.

Figure 14A:
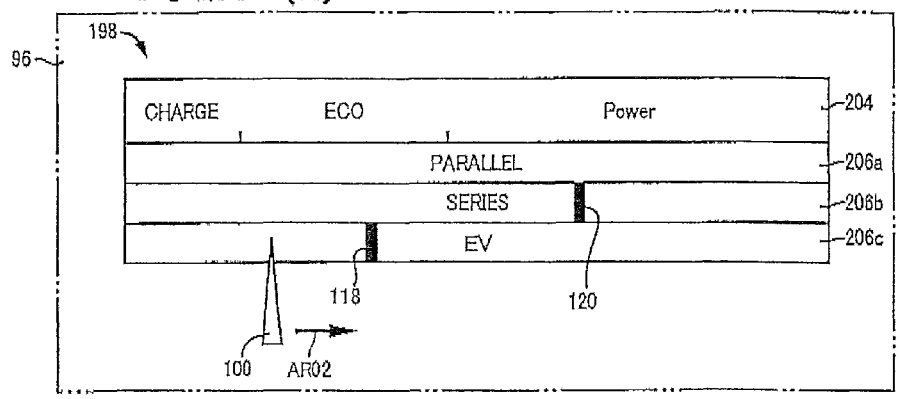
FIG. 14 are views showing examples of figures displayed on a display screen of a vehicular indicator device provided for the hybrid vehicle of FIG. 1, which examples correspond to but are different from those shown in FIGS. 6-8.
Figure 14B:
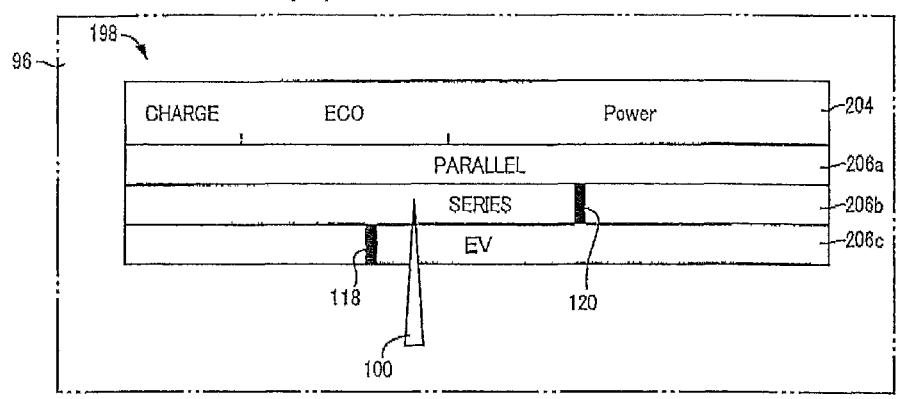
Figure 14C:
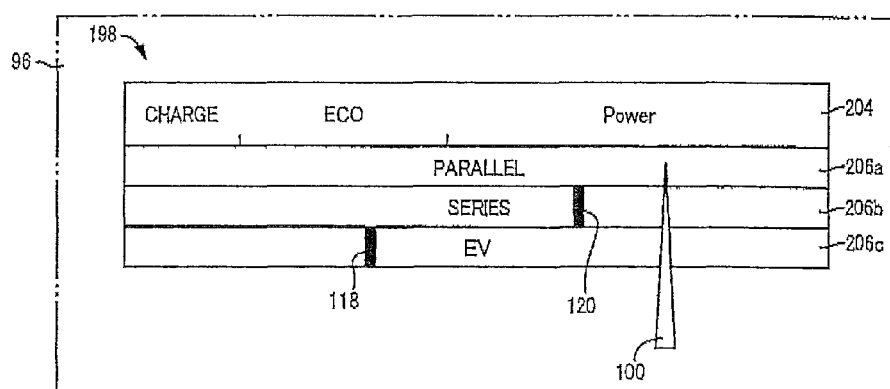

While the background panel figure 98 in the above-described first through third embodiments has a sectoral shape, the shape of the background panel figure 98 is not particularly limited. For example, the background panel figure 98 may be a circular shape, or a rectangular shape displayed on the display screen 96 in a two-dimensional rectangular coordinate system in which the vehicle drive power Xpwr is taken in a longitudinal direction of a rectangle, as shown in FIGS. 14(a)-(c). FIG. 14 are the views showing examples of images displayed on the display screen 96 in the two-dimensional rectangular coordinate system. FIG. 14(a) shows the pointer figure 100 indicating the EV drive mode, and FIG. 14(b) shows the pointer figure 100 indicating the series HV drive mode, while FIG. 14(c) shows the pointer figure 100 indicating the parallel HV drive mode. As shown in FIG. 14, a background panel figure 198 consists of a drive power indicator band 204 corresponding to the above-described drive power indicator figure 104, and a parallel HV drive mode indicator band 206a corresponding to the above-described parallel HV drive mode indicator band 106a, a series HV drive mode indicator band 206b corresponding to the above-described series HV drive mode indicator band 106b, and an EV drive mode indicator band 206c corresponding to the above-described EV drive mode indicator band 106c, which indicator bands 204, 206a, 206b and 206c are arranged in a direction perpendicular to the direction of movement of the pointer figure 100 (in the direction of an arrow AR02 indicated in FIG. 14(a)). The pointer figure 100 is moved in the longitudinal direction (indicated by the arrow AR02) of the background panel figure 198, to paint a position within the drive power indicator band 204, which position corresponds to the vehicle drive power Xpwr. Described more specifically, the pointer figure 100 is moved in the direction of the arrow AR02 with an increase of the vehicle drive power Xpwr, and the length of the pointer figure 100 from its base portion is changed to point one of the drive mode indicator bands 206a, 206b and 206c which corresponds to the vehicle drive mode selected by the hybrid drive control means 70.

Although the pointer figure 100 in the above-described first through third embodiments is displayed in the different colors corresponding to the vehicle drive modes selected by the hybrid drive control means 70, the pointer figure 100 need not be displayed in the different colors.

Figure 15A:
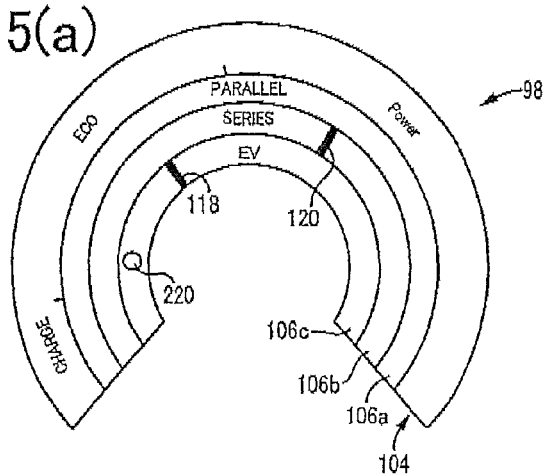
FIG. 15 are views showing a pointer figure in the form of a circle (circular dot) rather than a needle shown in FIGS. 6-8.
Figure 15B:
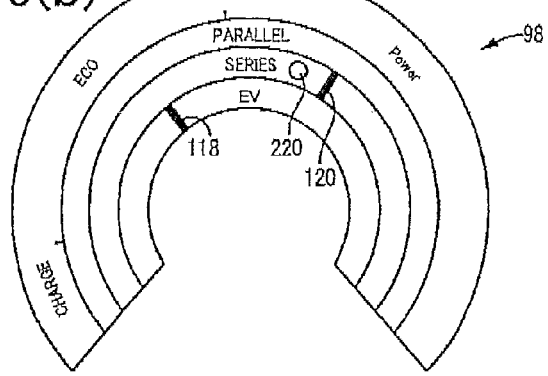
Figure 15C:
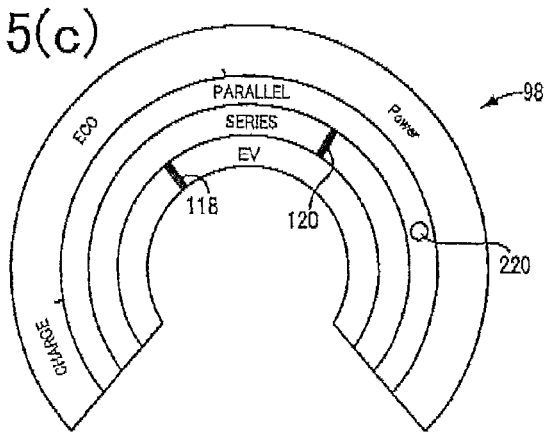

While the pointer figure 100 in the above-described first through third embodiments takes the form of a needle, the shape of the pointer figure 100 is not particularly limited. For instance, the pointer figure 100 may be replaced by a pointer figure 220 in the form of a circle (dot), as shown in FIGS. 15(a)-(c). FIG. 15(a) shows an example of the pointer figure 220 indicating the EV drive mode, and FIG. 15(b) shows further example of the pointer figure 220 indicating the series HV drive mode, while FIG. 15(c) shows further example of the pointer figure 220 indicating the parallel HV drive mode. As shown in FIGS. 15(a)-(c), the pointer figure 220 is rotated in the clockwise direction about its axis of rotation lying on the center of curvature of the background panel figure 98, with an increase of the vehicle drive power Xpwr, and is superimposed on the drive mode indicator band 106 corresponding to the vehicle drive mode selected by the hybrid drive control means 70.

In the above-described first through third embodiments, the vehicle drive mode is switched between the EV drive mode and the series HV drive mode, on the basis of the vehicle drive power Xpwr as compared with the above-described first drive power threshold value A. However, the vehicle drive mode may be switched between the EV drive mode and the series HV drive mode, on the basis of another quantity such as the vehicle running speed V or the above-described stored electric energy amount SOC, in addition to the vehicle drive power Xpwr as compared with a threshold value lower than the above-described first drive power threshold value A. This modification applies to the switching between the series HV drive mode and the parallel HV drive mode. In this modification wherein the vehicle drive mode is selected from among the plurality of drive modes on the basis of the vehicle drive power Xpwr as compared with a threshold value lower than the threshold value A or B, too, the vehicular indicator device 90 indicates the vehicle drive power Xpwr and the selected vehicle drive mode in the two-dimensional coordinate system on the display screen 96, so that vehicle operator is informed of the selected vehicle drive mode, without feeling uneasy about a change of the vehicle drive mode.

While the pointer figure 100 in the above-described first through third embodiments is pivoted with a change of the vehicle drive power Xpwr, the pointer figure 100 may be replaced by a pointer figure a mode of display of which is changed with a change of the vehicle drive power Xpwr. FIG. 16 is the view showing examples of figures including a pointer figure 250 which corresponds to the above-described pointer figure 100, and the mode of display, namely, the area of display of which is changed with a change of the vehicle drive power Xpwr. Described more specifically, the area of display of the pointer figure 250 in the two-dimensional rectangular coordinate system on the display screen 96 shown in FIG. 16 is enlarged with an increase of the vehicle drive power Xpwr. In the case specifically shown in FIG. 16, the pointer figure 250 indicates that the parallel HV drive mode is selected. The figures shown in FIG. 16 also include a background panel FIG. 248 consisting of: a drive power indicator band 254 corresponding to the above-described drive power indicator band 104; a parallel HV drive mode indicator band 256a corresponding to the above-described parallel HV drive mode indicator band 106a; a series HV drive mode indicator band 256b corresponding to the above-described series HV drive mode indicator band 106b; and an EV drive mode indicator band 256c corresponding to the above-described EV drive mode indicator band 106c. These indicator bands 254, 256a, 256b and 256c are arranged adjacent and in parallel to each other. The displayed pointer figure 250 consists of at least one bar, the number of which increases with an increase of the vehicle drive power Xpwr. When the displayed pointer figure 250 consists of two or more bars, these displayed bars are arranged in the longitudinal direction of the background panel figure 248 (in the direction of an arrow AR03). Thus, the area of display of the pointer figure 250 increases with an increase of the number of the displayed at least one bar arranged in parallel to each other, namely, with an increase of the vehicle drive power Xpwr. Further the length of the at least one bar indicating the vehicle drive power Xpwr, displayed on a side of larger vehicle drive power Xpwr, is determined to point one of the plurality of drive mode indicator bands 256a, 256b and 256c which corresponds to the vehicle drive mode selected by the hybrid drive control means 70. When the selected vehicle drive mode is the parallel HV drive mode, for instance, the length of each of the at least one bar displayed on one side of the displayed second threshold value indicator figure 120 (as seen in the direction of the arrow AR03) on which the vehicle drive power Xpwr is higher is determined such that the above-indicated at least one bar extends from the EV drive mode indicator band 256c up to the parallel HV drive mode indicator band 256a, and is superimposed on all of the three vehicle drive mode indicator bands 256a, 256b and 256c. When the selected vehicle drive mode is the series HV drive mode, the length of each of the at least one bar displayed on one side of the first threshold value indicator figure 118 on which the vehicle drive power Xpwr is higher is determined such that the above-indicated at least one bar extends from the EV drive mode indicator band 256c up to the series HV drive mode indicator band 256b, and is superimposed on the series HV drive mode indicator band 256b and the EV drive mode indicator band 256c, but not on the parallel HV drive mode indicator band 256a. When the selected vehicle drive mode is the EV drive mode, the length of each of the displayed at least one bar is higher is determined such that all of the at least one bar is located within and superimposed on the EV drive mode indicator band 256c, but not on the series HV drive mode indicator band 256b and the parallel HV drive mode indicator band 256a.

In the above-described first through third embodiments, the above-described operator-selected vehicle running mode is selected from among the above-described economy running mode, normal running mode and power running mode, so that the shifting condition of the automatic transmission 20 is changed according to the operator-selector running mode. However, the torque control conditions of the first and second electric motors MG1 and MG2 may be changed according to the operator-selected vehicle running mode, in place of or in addition to the shifting condition of the automatic transmission 20. In this case, the torque values of the first and second electric motors MG1 and MG2 are controlled to increase the vehicle drivability as the operator-selected vehicle drive mode is changed from the economy running mode to the normal running mode, and from the normal running mode to the power running mode.

NOMENCLATURE OF REFERENCE SIGNS

8: Hybrid vehicle
12: Engine
60: Battery (Electric-energy storage device)
90: Vehicular indicator device
96: Display screen
98, 198, 248: Background panel figure (Second figure)
100, 220, 250: Pointer figure (First figure)
118: First threshold value indicator figure (Third figure)
120: Second threshold value indicator figure (Third figure)
104, 204, 254: Drive power indicator band
106a, 206a, 256a: Parallel HV drive mode indicator band
106b, 208b, 256b: Series HV drive mode indicator band
106c, 206c, 256c: EV drive mode indicator band
MG1: First electric motor (Electric motor)
MG2: Second electric motor (Electric motor)

The invention claimed is:

1. A vehicular indicator device for a hybrid vehicle which is provided with vehicle drive power sources in a form of an engine and an electric motor and which is driven in one of a plurality of vehicle drive modes including an EV drive mode, a series HV mode and a parallel HV drive mode that is automatically selected according to a vehicle drive power, said vehicular indicator device being configured to indicate the selected vehicle drive mode and said vehicle drive power, the vehicular indicator device being configured:
  (i) to indicate a running state of the hybrid vehicle as represented by said vehicle drive power and said selected vehicle drive mode, in a two-dimensional coordinate system on a display screen, which coordinate system is defined by said vehicle drive power and said selected vehicle drive mode, and
  (ii) to display, on said display screen, a first figure a state of indication of which changes with a change of said vehicle drive power, and a second figure divided into a plurality of regions corresponding to said plurality of vehicle drive modes, said first figure pointing one of said plurality of regions within said second figure which corresponds to said selected vehicle drive mode, wherein
  an expected maximum running distance of the hybrid vehicle in each of said plurality of vehicle drive modes is calculated, based on an amount of an electric energy stored in an electric-energy storage device connected to said electric motor such that the electric energy is supplied to and received from said electric motor, and an amount of a remaining fuel to be supplied to said engine, and
  the calculated expected maximum running distance is indicated in said display screen.

2. The vehicular indicator device according to claim 1, further configured to display a third figure indicative of a threshold value of the vehicle drive power used to select one of said plurality of vehicle drive modes, at a position within said display screen which corresponds to said threshold value.

3. The vehicular indicator device according to claim 1, wherein different colors of display are predetermined respectively for said plurality of vehicle drive modes, and said first figure is displayed in one of the different colors of display which corresponds to said selected vehicle drive mode.

4. The vehicular indicator device according to claim 1, wherein said second figure has an arcuate drive power indicator region for indicating said vehicle drive power, and a plurality of arcuate drive mode indicator regions located along and concentrically with said drive power indicator region, said first figure taking a form of a needle which is pivoted about a pivot axis thereof lying on a center of curvature of said drive power indicator region and said drive mode indicator regions, to point a position within said drive power indicator region, which position represents said vehicle drive power, said needle being displayed such that a length of the needle from its pivot axis is changed to point one of said plurality of drive mode indicator regions which corresponds said selected vehicle drive mode.

5. A vehicular indicator device for a hybrid vehicle which is provided with vehicle drive power sources in a form of an engine and an electric motor and which is driven in one of a plurality of vehicle drive modes including an EV drive mode, a series HV mode and a parallel HV drive mode that is automatically selected according to a vehicle drive power, said vehicular indicator device being configured to indicate the selected vehicle drive mode and said vehicle drive power, the vehicular indicator device being configured:

(i) to indicate a running state of the hybrid vehicle as represented by said vehicle drive power and said selected vehicle drive mode, in a two-dimensional coordinate system on a display screen, which coordinate system is defined by said vehicle drive power and said selected vehicle drive mode, and (ii) to display, on said display screen, a first figure a state of indication of which changes with a change of said vehicle drive power, and a second figure divided into a plurality of regions corresponding to said plurality of vehicle drive modes, said first figure pointing one of said plurality of regions within said second figure which corresponds to said selected vehicle drive mode, wherein said second figure has an arcuate drive power indicator region for indicating said vehicle drive power, and a plurality of arcuate drive mode indicator regions located along and concentrically with said drive power indicator region, said first figure taking a form of a needle which is pivoted about a pivot axis thereof lying on a center of curvature of said drive power indicator region and said drive mode indicator regions, to point a position within said drive power indicator region, which position represents said vehicle drive power, said needle being displayed such that a length of the needle from its pivot axis is changed to point one of said plurality of drive mode indicator regions which corresponds said selected vehicle drive mode.

6. The vehicular indicator device according to claim 5, further configured to display a third figure indicative of a threshold value of the vehicle drive power used to select one of said plurality of vehicle drive modes, at a position within said display screen which corresponds to said threshold value.

7. The vehicular indicator device according to claim 5, wherein different colors of display are predetermined respectively for said plurality of vehicle drive modes, and said first figure is displayed in one of the different colors of display which corresponds to said selected vehicle drive mode.

* * * * *